US012293406B2

(12) United States Patent
Mousseau

(10) Patent No.: US 12,293,406 B2
(45) Date of Patent: May 6, 2025

(54) COMPUTER SYSTEMS, COMPUTER-IMPLEMENTED METHODS, AND COMPUTER DEVICES FOR PROCESSING A TRANSACTION MESSAGE

(71) Applicant: 10353744 Canada Ltd., Kitchener (CA)

(72) Inventor: Gary Mousseau, Waterloo (CA)

(73) Assignee: 10353744 CANADA LTD., Kitchener (CA)

( * ) Notice: Subject to any disclaimer, the term of this patent is extended or adjusted under 35 U.S.C. 154(b) by 152 days.

(21) Appl. No.: 16/864,062

(22) Filed: Apr. 30, 2020

(65) Prior Publication Data

US 2020/0349639 A1     Nov. 5, 2020

Related U.S. Application Data

(60) Provisional application No. 62/924,303, filed on Oct. 22, 2019, provisional application No. 62/840,435, filed on Apr. 30, 2019.

(51) Int. Cl.
*G06Q 40/02*     (2023.01)
*G06Q 10/10*     (2023.01)
(Continued)

(52) U.S. Cl.
CPC ............ *G06Q 40/02* (2013.01); *G06Q 10/10* (2013.01); *G06Q 20/027* (2013.01);
(Continued)

(58) Field of Classification Search
CPC .................................................. G06Q 40/02
(Continued)

(56) References Cited

U.S. PATENT DOCUMENTS 8,583,743 B1 * 11/2013 Gailloux ............... H04L 51/066
709/219
2015/0065186 A1 * 3/2015 Mohd Mohdi ......... H04W 4/10
455/518

(Continued)

OTHER PUBLICATIONS

Swift, Swift community to embark on migration to ISO 20022 for payments traffic, Sep. 25, 2018. (Year: 2018).*

*Primary Examiner* — Cho Yiu Kwong
(74) *Attorney, Agent, or Firm* — Own Innovation Inc.; James W. Hinton

(57) ABSTRACT

Systems, methods, and devices provide financial account services. The computer system provides financial services between one or more service requestor devices and one or more service provider devices. The computer system establishes links to one or more service provider devices by providing configuration to support the connection type, protocol and format of data exchanges with each of the service provider devices that have established links. The computer system authenticates each service provider device to establish trust for data exchanges. The computer system supports the reception of service requests from one or more service requestor devices. Then by using the configured link information, the computer system determines the type and format of service requests. The computer system transcodes the service request. The computer system permits the flow of service requests to two or more service provider devices when the configured link information are not similar.

19 Claims, 17 Drawing Sheets

(51) Int. Cl.
  *G06Q 20/02* (2012.01)
  *H04L 9/40* (2022.01)
  *H04L 67/02* (2022.01)
  *H04L 67/565* (2022.01)
  *H04L 69/22* (2022.01)
(52) U.S. Cl.
  CPC .......... *H04L 63/0876* (2013.01); *H04L 67/02* (2013.01); *H04L 67/565* (2022.05); *H04L 69/22* (2013.01)
(58) Field of Classification Search
  USPC ......................................................... 705/35
  See application file for complete search history.

(56) References Cited

U.S. PATENT DOCUMENTS

2015/0271178 A1\* 9/2015 Bhattacharya ........ H04L 63/101
  726/1
2017/0140385 A1\* 5/2017 Dobson .............. G06Q 20/4016

\* cited by examiner

COMPUTER SYSTEMS, COMPUTER-IMPLEMENTED METHODS, AND COMPUTER DEVICES FOR PROCESSING A TRANSACTION MESSAGE

TECHNICAL FIELD

The following relates generally to computer-implemented technologies, and, in particular to computer systems, computer-implemented methods, and computer devices for processing a transaction message.

INTRODUCTION

The world of financial technology, known as Fintech, is concerned with the provision of electronic financial services using one or more computing devices, often over a computer network such as the Internet.

Fintech is starting to standardize all its interfaces to facilitate a universal spread of interconnectivity. However, there are a growing number of competing open banking technology standards emerging. If different jurisdictions fail to select one single standard then unification will be very difficult.

These technology standards mostly rely on existing Internet standards such as Hypertext Transfer Protocol Secure (HTTPS), Representative State Transfer (REST), Java Script Object Notation (JSON), Extensible Markup Language (XML), OAuth 2.0, OpenID Connect (OIDC), ISO-20022, and others.

Different groups such as the Berlin Group, the French Banking Federation, the OpenID's Financial-grade API, the Open Banking Standard from the United Kingdom, the Financial Data Exchange's Durable API (DDA) standard, and others are all asserting their particular technology standard.

Although these represent initial steps towards building technology bridges and solutions, these technology standards do not solve the problem of creating functional technology solutions and solving the technical problem of legacy connectivity and the unification of electronic banking connectivity. Connecting new computer systems to old computer systems is a problem often ignored but with very real consequences when many customers and businesses are affected.

Additionally, many financial institutions run a collection of computer servers that must process all requests that come in from the outside world. In some cases, aggregation servers, such as Interac™ in Canada, try to pre-process and route information to the association of financial institutions that support the aggregation server. However, when all these different standards must be processed in one central host server, the complexity and throughput speed may drop dramatically.

Additionally, the ISO20022 standard, which is the electronic data interchange standard at the heart of the Open Banking movement, has over 400 message types, making parsing and subsequent processing even slower and more processor intensive.

A technological solution to this technical problem is required. For example, a technological solution is required that supports different emerging technology standards and which provides customers (including consumers, retailers and businesses) with useful technical features that may provide benefit and make this move to a modern financial technology solution.

Additionally, a technological solution is desired that can connect with legacy computer systems so that helpful technical features can reach into financial institutions that are slow to adopt standards but want customers to experience the benefits.

A technological solution is also desired that can extend cybersecurity to new levels to handle advanced Fintech product offerings and emerging computer-implemented services and service provider computer devices.

Additionally, a technological solution which includes a set of processing advancements is desired to address the processing demands of different standards and a large number of message format types. Processing solutions are desired for the many different types of emerging financial institutions, fintech products, and fintech services that have been promised by the Open Banking community.

SUMMARY

Provided is a computer system and computer-implemented method for providing a range of electronic financial services to customers by connecting to multiple financial institution computer systems (associated with respective financial institutions) using one or more emerging data connection standards and data access methods. Further, in some embodiments, the computer system offers an advanced cybersecurity technological solution that may improve overall electronic financial transactions for customers, businesses and retailers.

In one aspect, there is provided a computer system to provide electronic financial services between one or more service requestor devices and one or more service provider devices. The computer system establishes data communication links to one or more service provider devices by providing configuration to support the connection type, protocol, and format of data exchanges with each of the service provider devices that have established links. The computer system authenticates each service provider device to establish trust for data exchanges. The computer system supports the reception of service requests from the one or more service requestor devices. Then, by using the configured link information, the computer system determines the type and format of the service requests. The computer system transcodes the service request. The computer system permits the flow of service requests to two or more service provider devices when the configured link information is not similar.

Service requestor devices may include any one or more of consumer devices, business devices and retailer devices. To perform financial service transactions, service requestor devices have extended capabilities in many areas. For example, some might have advanced biometric capture and compare, and others might also have advanced tamper-proof storage systems like a secure enclave method to prevent secret PINS, encryption keys and other financial transaction elements to be lost, stolen or tampered with. There could also be handwriting input and recognition capabilities, bar code scanning, Near Field Communication (NFC) support and other capabilities of this nature.

Service provider devices may include bank devices and financial sub-network devices that connect to one or more bank devices and financial institution devices.

Service provider devices may include an insurance investment institution device, a fintech bank device working with cryptocurrencies device or regular government issued currency devices, a mobile bank device, a social-network virtual bank device or other custom-built financial service provider devices.

To connect to all these different types of service requestor devices and service provider devices the computer system can establish data communication links to the service requestor devices using one or more types of physical communication connections including fibre optics, Ethernet, wireless means like GSM, Edge, UMTS, WiFi protocols like 802.11 and variations thereof. Short range connections are used in some embodiments, such as Bluetooth and Near Field Communications (NFC). Other embodiments may use X.25 links or older custom links in various forms, for example when connecting to long-established financial institution devices.

Over the established links, the computer system is configured to support a wide range of data communication protocols and data communication formats as needed to connect with the service requestor devices and the service provider devices. The data communication protocols and data communication formats may support the broad requirements of second Payment Service Directive (PSD2), as set out in the Regulator Technical Standards (RTS) and following Strong Customer Authentication (SCA) requirements. The data communication protocols and data communication formats may support the Berlin version NextGenPSD2, the French STET protocols and Britain's Open Banking regulations. In some embodiments, the data communication protocols and data communication formats include any one or more (including combinations thereof) of secure Hypertext Transfer Protocol (HTTPS), Representative State Transfer (REST), Java Script Object Notation (JSON), OAuth 2.0, OpenID Connect (OIDC), and Extensible Markup Language (XML), with the specific formats of XML detailed in ISO standard 20022.

In another aspect, there is provided a computer system that provides electronic financial account services through an interface services and API module.

The interface services and API module provides a variety of connection methods for receiving incoming requests.

The computer system includes a security module. The security module performs a randomized multifactor authentication process. The randomized multifactor authentication process may ensure that client devices connecting over a variety of connection methods are authorized. The security module assigns an authorization code. The authorization code may last an unpredictable amount of time before being renewed.

The computer system includes a service mapping module. The service mapping module processes incoming requests to determine what financial account services are being requested by the incoming request.

The service mapping module uses the request to provide direction as to which of the one or more financial institution devices will be used to fulfil the incoming request.

The service mapping module may ensure that the incoming request provides the necessary fields to comply with the one or more required informational elements required by the financial institution devices for the requested service, while maintaining necessary transactional state information to ensure the incoming request reaches its completion.

The financial account services may include any one or more of account information services, payment initiation services, and insurance services.

The interface service and API module may support a plurality of connection methods for receiving incoming requests. The plurality of connection methods may include, for example, any one or more of Internet links, fibre optic links, wireless links, dedicated links, and different custom links.

The authentication process implemented by the security module may include any one or more of the following security types: biometrics, one-time passwords, personal identification numbers, transport layer security (TLS), open authentication (OAuth), or a customer authentication process. Multifactor choices may include additional techniques such as cell phone identification values, security keys and USB keys, RFID tags, harvested computer values and code and other unique identification values. To provide these services a wide range of financial institution devices may be supported. Supported financial institution devices may include, for example, account servicing payment service provider devices, bank devices, credit union devices, money lender devices, financer devices, government devices, mortgage provider devices, loan provider devices. Financial institutions have a high cyber and data security bar and a great deal of specialized financial transaction software. A bank or credit union maintains a customer database with a myriad of possible protection mechanisms.

In some embodiments there is be real-time mirrored database installations ensuring that computer failure or hard drive storage failure will not cause a catastrophic loss of information. In some embodiments, advanced power and back-up power planning exists in the network operations center of a financial institution to ensure that no data is lost due to power blackouts, brownouts or total power loss. Customer data may also be streamed to an offsite storage and replication facility to ensure a backup of customer files is always possible. This allows for dramatic planning in the case of war, nuclear strikes or major building issues like pandemics or building safety issues from earthquakes, flooding, tornadoes and hurricanes. In some embodiments, additional firewall and security protocols are in place where the computers are held and maintained.

Incoming requests may be received from consumer devices, which may be fixed or mobile, retailer devices, or business devices. In some embodiments, the incoming requests are received by advanced methods including Bluetooth, UFC, Internet-of-Things (IoT) links and connection methods, from wearable devices including watches, glasses, necklaces and others. Connections may be received via voice commands from cell phones, vehicles, autonomous drones using voice activation and other methods that use a combination of the above.

The systems of keeping transactional state information can in some embodiments also include a synchronization module. The synchronization module ensures transactional steps and elements are received in a timely manner.

In some embodiments, a timer module may be used. The timer module ensure issues with coverage, roaming, and out of coverage conditions are managed so that transactions are fully completed and the digital integrity of the financial transactions are protected. Digital integrity refers to the ability to complete one or more complex steps that make up a digital financial transaction, in a way that parties are satisfied and elements of the transaction are electronically completed and verified with a high degree of confidence.

In some embodiments, the system includes a coordination module. The coordination module may divide one request into multiple requests and send the multiple requests to one or more financial institution devices. The coordination module may be further configured to re-assemble the responses to a request when it has been broken into one or more requests.

In another aspect, there is provided a computer system to authenticate both service requestor devices and service provider devices.

The computer system establishes authentication to one or more service requestor devices and service provider devices using a multi-factored method.

The computer system may support the establishment of connections using elements derived from the authentication when services are requested between service requestor devices and service provider devices.

The computer system executes a method of randomly re-establishing authentication to re-establish trust with service requestor devices or service provider devices.

During the authentication re-establishment events, the computer system is capable of randomly selecting between two or more multi-factored authentication methods, such that service requestor devices and service provider devices cannot predict when the next request for authentication might be required and service requestor devices and service provider devices cannot predict which of the two or more multi-factored authentication methods will be required.

In some embodiments, the computer system uses authentication to create one or more authentication codes that cannot be used to derive any other authentication values. The codes can be renewed each time a new authentication is performed. In some embodiments, the maximum length before re-establishing authentication is limited by standards so that the duration between re-establishments does not exceed the standard limit.

In some embodiments, the computer system layers security on top of secure HTTP (HTTPS) connections and open authentication (OAuth) methods.

Multifactor authentication techniques used by the system may include any one or more elements of things known to the other system including passwords, passphrases, answers to pre-established questions, PIN values, sequence values and other such known values.

Multifactor authentication techniques may include items owned by the other system such as mobile phones, phone SIM cards, computer systems, RFID tags, SecurID tokens, wearable devices, smart cards, smart badges, laptops, tablets and other such owned items.

Multifactor authentication techniques may include inherited items (e.g. user physical or physiological characteristics) such as fingerprints, finger vein scan, heartbeat rhythm, hand geometry, facial and voice recognition, iris or earlobe geometry, DNA signature, or other such inherited item.

In some embodiments, the multifactor authentication uses harvested computer values and harvested codes from desktop and mainframe computers, laptops, wearable devices, and mobile devices. The harvested computer values and harvested codes may include values and codes of which a user or business has knowledge or other values and codes hidden deep within a computer system, such as those which are only accessible via computer software exaction means. These and other types of unique values may add additional levels and factors to the multifactor authentication requirements.

In some embodiments, harvesting secure values and codes is used on specialized networks such as WiFi networks, private area networks, LAN networks, or Internet-of-Things (IoT) type networks.

IoT networks may be used in jurisdictions and public environments making them susceptible to criminals and cyber-attacks. Such extraction may be performed on routers, firewalls, cell towers and other elements of the network system.

According to some embodiments, there is provided a computer system and computer-implemented method for providing financial services between one or more service requestor devices and one or more service provider devices.

The computer-implemented method includes establishing links to one or more service provider devices; configuring the supported connection type, protocol, and format of data exchanges with each of the service provider devices that have established links; performing necessary authentication steps with each service provider device to establish trust with data exchanges; supporting the reception of service requests from one or more service requestor devices; and using the configured link information to determine the type and format of service requests. The computer system may use transcoding methods to permit the flow of service requests to two or more service provider devices when the configured link information is not similar.

The physical link may include any one or more of Internet link, dedicated link, X.25 link, wireless link, or a custom link.

The service requestor device may include any one or more of: a consumer device, a business device, a retailer device, a financial technology service provider device, and a custom requestor device.

The service provider may include any one or more of a bank device, a loan institution device, an investment institution device, an insurance institution device, a financial sub-network device, a fintech bank device, a mobile bank device, a social-network bank device, and a custom financial services provider device.

The logical connection type may include any one or more of an Interac™-based connection, a PSD2 connection, a STET connection, a NextGenPSD2 connection, and a custom connection type.

Also provided herein is a computer system capable of offering financial account services.

The computer system includes a client reception module. The client reception module provides a plurality of different connection methods for receiving incoming service requests. The client reception module provides an authentication process for ensuring client devices connecting over the variety of connection methods are authorized. The client reception module processes incoming service requests to determine what services are being requested by the incoming service request such that the service request provides direction as to which financial institution device will be used to fulfil the requested incoming request. The service request provides the necessary fields to comply with the required financial institution device format requirements for such a requested service. The client reception module maintains the necessary transactional state information to ensure the incoming request reaches completion.

The financial account services may include any one or more of account information services, payment initiation services, and insurance services.

The connection method for receiving incoming requests may include any one or more of an Internet link, a fibre optic link, a wireless link, a dedicated link, or a custom link.

The authentication process may include any one or more of biometrics, one-time passwords, personal identification numbers, transport layer security (TLS), open authentication (OAuth), and a customer authentication process.

The financial institution device may include any one or more of an account servicing payment service provider device, a bank device, a credit unions device, a money lender device, a financer device, a government device, a mortgage provider device, and a loan provider device.

The client device may include any one or more of a retailer device, a consumer device, and a business device.

The connection may include any one or more of a Bluetooth connection, a connection from wearable devices, a connection using vehicular transport, and a connection of Internet of Things (IoT) methods.

The state information may be kept for each stage of a financial service offering for a specific time period. For example, the state information may be held for as long as necessary for the exchange to be complete and no longer.

The synchronization elements may be included to provide timers, semaphores and tracking information to ensure pauses and varying data communication speeds are managed, enabling the integrity and completion of financial transactions.

The computer system may be configured to divide one service request into a plurality of service requests to be transferred to one or more service provider devices.

Also provided herein is a computer system and computer-implemented method for authenticating both service requestor devices and service provider devices.

The computer-implemented method includes establishing authentication to one or more service requestor devices and service provider devices using a multi-factored method. The computer-implemented method also includes supporting the establishment of connections using elements derived from the authentication when services are requested between service requestor devices and service provider devices. The computer-implemented method also includes executing a method of random re-establishing authentication using randomly selected multi-factored authentication, such that service requestor devices and service provider devices cannot predict when the next request for authentication might be required and service requestor devices and service provider devices cannot predict which of the two or more multi-factored authentication factors will be required.

The multi-factored authentication may include two or more factors. The two or more factors may include any one or more of a knowledge factor, a possession factor, and an inheritance factor.

The knowledge factor may include any one or more of a password, a personal identification number (PIN), an answer to a pre-established question, and other similar mentally known or remembered items.

The possession factor may include any one or more of a security token, a one-time password token, an employee card, a mobile device or a SIM card within a mobile device, harvested information from one or more computer systems, and mobile devices, and other similar physically held and possessed item.

The inheritance factor may include any one or more of a retina scan or iris scan, a fingerprint scan or finger vein scan, heart beat rhythm, facial recognition, voice recognition, hand geometry, earlobe geometry, and other similar bodily elements or user- or human-possessed physical or physiological characteristics or traits.

In an aspect, a computer-implemented method for processing one or more financial transactions message formats using a universal message format withing a gateway device is provided. The method includes: receiving a message at one or more connection processing devices, each connection processing device capable supporting a non-compatible physical link; performing an initial scan of the message header to identify any non-ISO 20022 message formats for processing in a legacy processing device; tokenizing any non-ISO 20022 message formats into a universal message format for processing by a message processing device; parsing the different types of ISO 20022 message formats into a universal message format for processing by a message processing device; such that: the message processing across different message formats is unified through a common universal message format; compatibility between service requestors and service providers is enabled through a single gateway device using a universal message format; and any supported format can be restructured from the universal message format for the construction of outgoing messages.

The connection processing device may be capable of categorizing the quality of service for the physical link in real-time. The connection processing device may be a custom build to support high-latency satellite links.

The universal message format may be a data-structure that holds information about the connection status and transaction status.

In another aspect, a computer system and computer-implemented method of offering digitally authenticated financial services to service requestors and service providers using a gateway device for processing various message formats is provided. The method includes: receiving one or more messages into connection processing devices, each connection processing device capable supporting a non-compatible physical link; performing an initial scan of the message header to identify digital authentication requests and performing one or more digital authentication steps to generate a security token; using the security token on behalf of the service requestor when requesting financial services; parsing and tokenizing incoming service requests received in one or more financial message formats, into a universal message format for processing by a message processing device; building one or more outgoing service requests using the universal message format on behalf of the service requestor to one or more financial service providers, such that: compatibility between incompatible service requestors and service providers is enabled through a gateway device using a universal message format; authentication requests from service providers can be processed on behalf of the gateway device for service requestors; and any format can be restructured from the universal message format for the construction of outgoing messages.

The connection processing device may be capable of categorizing the quality of service for the physical link in real-time. The connection processing device may be a custom build to support high-latency satellite links.

Interactions with service providers may also result in digital authentication being performed on service providers.

The digital authentication performed on service providers may use a randomized method for selecting two or more multi-factored authentication methods that are to be provided.

In another aspect, a computer-implemented method of providing financial services by supporting one or more parsing methods for each type of financial transaction format using customized parsers, the system comprising: one or more connection processing devices for receiving a variety of non-compatible financial services messages, over different types of physical links; a first parser that identifies non-ISO 20022 compliant message for processing in a legacy tokenization device; a legacy tokenization device that parses non-ISO 20022 messages for routing by a message content router device; a message header parser that identifies different types of ISO 20022 message formats and routes each to a customized content parser device; a customized content parser device optimized for parsing specific ISO 20022 message formats for tokenizing the message for routing by a message content router device; a message content router device that routes the parsed messages to a specific message processing device that is built to process specific messages, such that: the customized content parser device is optimized to use the most efficient methods for parsing specific ISO 20022 formats; a message content router device is used to unify the routing of all payload formats to matching message processing devices; and a specific message processing device that processes the tokenized message and constructs one or more output messages to connection service providers.

The connection processing device may be capable of categorizing the quality of service for the physical link in real-time. The connection processing device may be a custom build to support high-latency satellite links.

In another aspect, a method of providing both access to financial services through a user interface and API service requests using a gateway device, the method comprising: receiving a message at one or more connection processing devices, each connection processing device capable supporting a non-compatible physical link; performing an initial scan of the message header to identify user interface messages and API based messages; processing API service requests and routing the API service requests to connected service offerings; providing financial services through the user interface by accessing a services database device that identifies one or more locally connected service offerings; accepting user interface selections of service offerings and building API service requests on behalf of the connected users, such that: all API service requests are processed through the same message processor device; and both user interface service requests and API service requests appear the same to the one or more connected service providers.

The connection processing device may be capable of categorizing the quality of service for the physical link in real-time. The connection processing device may be a custom build to support high-latency satellite links.

Interactions through the user interface may follow an HTML format.

In another aspect, a computer system and computer-implemented method of providing a quality sensitive financial services gateway that adjusts to communication issues, the system comprising: one or more connection processing devices for receiving incoming financial services messages, each connection processing device capable of identifying and classifying the quality of service over that connection; quality of service modules within the connection processing devices that monitor round trip message delivery times to adjust the quality of service over each of the connections being supported; message processing devices that can take in account quality of service parameters when setting timers for financial transactions, such that: financial transaction requests that arrive over physical links with low speeds or longer latencies are given additional time on top of the configured time to complete their transactions; and financial transaction requests that arrive over physical links with normal speeds and normal latencies are given the configured time to complete their transactions.

Provided is a computer-implemented method of processing a transaction message using a universal message format, the method comprising: scanning of a message header of a transaction message to determine whether the transaction message has a non-standard message format or a standard message format; generating a universal format data structure having a universal message format by performing one of: tokenizing a non-standard message format into the universal message format for processing by a legacy processing device; parsing a standard message format into the universal message format for processing by a message processing device; and generating an outgoing message from the universal format data structure, wherein the outgoing message has a message format that is supported by a receiving device.

The transaction message may be an external message received from a service requestor device or a service provider device.

The transaction message may be an internal message comprising a service request message generated from a user interface message received via a user interface for offering financial services.

The standard may be ISO 20022 and the non-standard message format is a NACHA file format or a SWIFT format.

The transaction message may include a payload, and wherein the payload arrives within a secure Hypertext Transfer Protocol used for content sent over TCP/IP.

The method may further comprise receiving the transaction message at a connection processing device configured to support a non-compatible physical link.

The universal format data structure may be configured to hold information about a connection status and a transaction status.

The method may be performed within a gateway device.

The scanning of the message header may further include examining data within a TCP/IP message payload to determine a payload format.

The scanning of the message header may further include scanning a payload arriving with a secure Hypertext Transfer Protocol.

The method may further comprise routing the transaction message via a message content router to a specific message type processing module.

The parsing the standard message format into the universal message format for processing by a message processing device includes parsing the standard message format using a standard header parser configured to scan the message header to determine which standard payload format is present in the transaction message.

The method may further comprise routing the transaction message to a standard XML parser, a standard JSON parser, or a standard default parser based on the standard payload format. The standard may be ISO 20022. The standard payload format may be an ISO 20022 payload format. The standard XML parser may be an ISO 20022 XML parser. The standard JSON parser may be an ISO 20022 JSON parser. The standard default parser may be an ISO 20022 default parser.

The parsing the standard message format into the universal message format for processing by a message processing device further comprises determining an standard payload format of the transaction message by scanning an HTTP header of the transaction message and routing the transaction message to a standard parser configured to parse the standard payload format.

The scanning the message header includes using a scan-ahead scanning method which scans a message buffer of the transaction message.

The scanning the message buffer includes looking for keywords or phrases within the message buffer.

The universal format data structure is configured to accommodate each field for each type of potential message to be sent or received.

The method may further include routing the universal format data structure to a specific message type processing module based on a standard message identifier, and wherein the specific message type processing module is configured to process a standard message having the standard message identifier.

The generating the outgoing message from the universal format data structure includes pulling one or more fields required by the message format of the outgoing message from the universal format data structure.

The method may further include determining the message format of the outgoing message by referencing a services database configured to store a message format type required by the receiving device.

The transaction message may be a service request message from a service requestor device, and wherein the method further comprises storing one or more data elements from the service request message that are not required by the message format of the outgoing message for use on a subsequent response message directed to the service requestor device.

Provided is a computer-implemented method of providing access to services through a user interface and (application programming interface) API service requests using a gateway device. The method includes receiving a services message at a connection processing device configured to support a non-compatible physical link, the services message including a message header; processing the services message for service mapping by a service mapping component, including: scanning the message header to determine whether the services message is a user interface message or a direct financial message; if the services message is a user interface message, building a standard message using request information received via the user interface and passing the standard message to the service mapping component; if the services message is a direct financial message, passing the direct financial message to the service mapping component; and wherein the service mapping component is configured to generate an outgoing service request from the services message, the outgoing service request having a message format that is supported by a receiving service provider device.

The scanning the message header to determine whether the services message is a user interface message or a direct message includes scanning the message header to determine whether the services message is an HTTP/HTTPs HTML-based message, and wherein the method further comprises classifying an HTTP/HTTPs HTML-based message as a user interface message.

The scanning the message header to determine whether the financial services message is a user interface message or a direct message includes scanning the message header to determine whether the services message is an HTTP/HTTPs HTML-based message, and wherein the method further comprises classifying a non-HTTP/HTTPs HTML-based message as a direct message.

The outgoing service requests generated from user interface service requests and outgoing service requests generated from direct messages service requests appear the same to the receiving service provider device.

The receiving service provider device may be selected from a group consisting of a bank institution device, a loan institution device, a cryptocurrency institution device, a financial subnetwork device, a bank device, a fintech bank device, a mobile bank service provider device, a pop-up bank device, a social network bank device, a credit union device, and a financial backbone device.

The direct services message may be an API-based service request received using an API style of communication employed for computer-to-computer communication.

The services message may be received by the connection processing device over a connection, and wherein the connection is over a public network, a physical network, a virtual private network, a direct leased line, a function call or a data communication method for exchanging messages.

The connection processing device may include redundant connection modules for managing protocol differences between an HTTP over TCP/IP methodology and a non-HTTP over TCP/IP protocol methodology.

The services message may be received via a front-end interface, and wherein the front-end interface is presented to a user based on the user being a registered user with rights to access one or more hosted financial services.

The method may further include providing a user interface comprising an HTML screen configured to present one or more services listed in a services database and receiving the services message via the user interface.

The method may further include the services database stores services data including any one or more of service provider identifier, service provider name, service name data, service details data, link data, service identity data, and a data format required by the service.

The method may further include maintaining a user database of users authorized to access the services via the user interface, receiving user identity verification data from a user via the user interface, and determining whether to provide access to the user using the user identity verification data and the user database.

The method may further include verifying an identity of a user of the user interface using OAuth 2.0 digital identity services.

The method may further include verifying a digital identity of a user of the user interface via an OAuth 2.0 API client to perform a transparent exchange of a digital identity credential with a security component, and processing an HTML component of the user interface message to access services upon successful verification by the security component.

The user interface may comprise a web browser configured to present financial services, receive a user selection of financial services, and provide an input an input and authentication needed to generate a service request.

The request information may include input data received from the user via the user interface and cached data.

The direct message may be program-to-program communication in which a requesting program is using an ISO 20022 message format.

The direct financial message may be a non-ISO 20022 message format.

The generating the outgoing service request includes transcoding the services message from a first message format into an outgoing service request having a second message format.

The transcoding the services message from the first message into the second message format is performed using a universal message format.

The generating the outgoing service request includes generating a first outgoing service request and a second outgoing request from the services message, wherein the first outgoing service request is destined for a first receiving service provider device and the second outgoing service request is destined for a second receiving service provider device, and wherein the first and second outgoing service requests are in a message format matching their respective receiving service provider devices.

The method may further include determining the message format of the outgoing service request using a services database for storing required message formats of service providers.

The services message may be an ISO 20022 XML message, an ISO 20022 JSON messages, a SWIFT message, a NACHA message, or even a proprietary message format following an aggregation server format.

The outgoing service request may be an ISO 20022 XML message, an ISO 20022 JSON messages, a SWIFT message, a NACHA message, or even a proprietary message format following an aggregation server format.

Provided is a financial services gateway computer system for processing financial transactions capable of adjusting to communication issues. The computer system includes a connection processing device for receiving an incoming financial services message of a financial transaction via a supported connection, the connection processing device configured to determine a quality of service classification over the supported connection; wherein the connection processing device includes a quality of service ("QOS") module configured to monitor round-trip message delivery times and adjust the quality of service classification over the supported connection; and a message processing device configured to set a timer for completion of the financial transaction based on the quality of service classification.

The computer system may include a first quality of service classification and a second quality of service classification, and wherein the message processing device is configured to give financial transactions assigned the second quality of service classification longer than financial transactions assigned the first quality of service.

The quality of service classification is determined based on a quality of service parameter, and wherein the quality of service parameter includes at least one of speed and latency, and wherein the supported connection is assigned the first quality of service classification if the quality of service parameter meets a quality of service parameter threshold, and wherein the supported connection is assigned the second quality of service classification if the quality of service parameter does not meet the quality of service parameter threshold.

The quality of service classification is determined based on a quality of service parameter, and wherein the quality of service parameter includes at least one of speed and latency, and wherein the supported connection is assigned the first quality of service classification if the quality of service parameter meets a quality of service parameter threshold, and wherein the supported connection is assigned the second quality of service classification if the quality of service parameter does not meet the quality of service parameter threshold, and wherein the quality of service parameter threshold includes a speed threshold and a latency threshold.

The supported connection is assigned the first quality of service classification only if the supported connection meets each of the speed threshold and the latency threshold.

The supported connection is assigned the second quality of service classification if the supported connection fails to meet only one of the speed threshold and the latency threshold.

The QOS module monitors round trip message delays to indicate real-time changes to throughput and latency.

Upon detecting a change in a quality of service, a connection module may make one or more modifications to an HTTP/HTTPs header to indicate a satellite or cellular RF link is being utilized for a given financial transaction request and that such link is experiencing delays.

The QOS module may be further configured to provide quality of service information and connection characteristics for the supported connection to a service mapping component, and wherein the service mapping component is configured to perform at least one of adjusting a timer and adjusting a retry algorithm for the financial transaction using the quality of service information and connection characteristics.

The supported connection may be a satellite link or a cellular RF link.

The connection processing device may be configured to assemble a connection type, a protocol used, and quality of service information for the supported connection, and wherein the connection processing device is further configured to associate the assembled information for the supported connection with the financial transaction.

The connection processing device may be configured to provide a connection type indicator for the supported connection to a service mapping component, and wherein the service mapping component is configured to adjust a behaviour of the service mapping component for the financial transaction based on the connection type indicator.

The connection processing device may include a private connection module for processing a private connection, a public connection module for processing a public connection, and a specialized connection module for processing a specialized connection, and wherein the connection processing device uses the private connection module if the supported connection is a private connection, a public connection module if the supported connection is a public connection, or specialized connection module if the supported connection is a specialized connection.

The private connection may be one of an Internet-of-Things connection, a Bluetooth connection, and a WiFi connection, wherein the public connection is one of a cellular RF network and a TCP/IP-based network, and wherein the specialized connection is a satellite link.

The supported connection may be a near real-time, Internet-quality ISP link.

The supported connection may be a satellite link, and wherein the connection processing device is configured to support the protocol requirements and timing requirements of the satellite link, and wherein any one or more of latency data, round-trip delay data, and slot allocation requirement data is included in control data used with each information exchange.

The computer system may be configured to use a standard timer for the exchange of messages and transactions, wherein the computer system is configured to determine whether connection properties of the supported connection deviate from standard connection properties, and wherein a service mapping component is configured to adjust the standard timer based on the deviation of the supported connection from the standard connection properties.

The standard connection properties may be based on a baseline set of connection characteristics determined from typical transmission speeds over high-speed networks.

Provided is a computer-implemented method of providing financial services using message format-based parsing for non-compatible financial services messages. The method comprising receiving, via a connection processing device, a financial services message over a physical link; parsing the financial services message to determine whether the financial services message is a standard message or a non-standard message; generating a tokenized financial services message by performing one of: if the financial services message is a non-standard message: passing the non-standard message to a legacy tokenization module; and parsing the non-standard message for routing by a message content router; if the financial services message is a standard message: scanning a message header of the standard message to determine which standard message format is present; and routing the standard message to a customized content parser module configured to parse the standard message format for tokenizing the standard message for routing by the message content router; routing the tokenized financial services message to a specific message type processing module; processing the tokenized financial services message and constructing one or more output financial service messages, wherein each output financial service message is in a message format supported by a receiving device.

The financial services message may be a service request, and wherein the method further comprises splitting the service request into a plurality of service requests, wherein the plurality of service requests are each destined for a different service provider.

The financial services message may be a service request from a service requester device, and wherein the method further comprises splitting the service request into a plurality of service requests and coordinating responses to the plurality of service requests into a single response message to the service requester device.

The financial services message may be a request message, and wherein the method further comprises splitting the request message into a plurality of request message and setting a timer for each of the request messages.

The method may further include receiving a plurality of response messages to the plurality of request messages and assembling the response messages into a unified service response.

The method may further include identifying a message format for each of the plurality of request messages using a services database, the services database storing service provider descriptions including required message formats for a plurality of service providers.

The message transaction may be aborted upon if the time expires before reaching a certain state.

The constructing the one or more output messages may include referencing a services database for any one or more of a connection link type, a required message format, and a service identity.

The one or more output messages may include a plurality of request messages, and wherein the method further comprises synchronizing a plurality of response messages received in response to the plurality of request messages.

The synchronizing may include monitoring which of the plurality of service responses have been issued and which of the plurality of service responses remain outstanding.

The synchronizing may include using a state driven engine that is driven by events that transpire through message flows between a service requestor and a service provider.

The processing the tokenized financial services message and constructing the one or more output financial service messages may further comprise referencing a service provider database of service provider descriptions for enabling parsing and processing that follows a standard used by a given service provider.

The standard may be the Berlin Group's NextGen PSD2 format, the French Banking Federation (FBF) API standard driven by the bank owned STET company, OpenID's Financial-grade API (FAPI), the Open Banking Standard from the United Kingdom, the Financial Data Exchange's Durable API (DDA) standard, or the PolishAPI standard.

The method may further include referencing a service provider database of service provider descriptions to identify a matching API or interface for the receiving device when constructing the one or more output financial services messages.

The method may further include making a direct procedure call to retrieve required response information before constructing the one or more output financial services messages.

The financial services message may be a service request, and wherein the method further comprises determining how many service providers and which service providers to use for the service request.

The financial services message may be a service request from a service requestor, and wherein the method further comprises determining how many service providers have been selected by a service requester to provide a service and generated a matching number of service requests.

The method may further include setting a timer for each of the matching number of service requests.

The method may further include excluding any service responses which do not provide a response in accordance with the timer from a final response to the service requestor.

A computer-implemented method of offering digitally authenticated services to service requestors and service providers using a gateway device configured to process a plurality of message formats is provided. The method includes: receiving a message into a connection processing device configured to support a non-compatible physical link, the message including a message header; performing an initial scan of the message header to identify a digital authentication request; performing one or more digital authentication steps to generate a security token; using the security token on behalf of a service requestor when requesting services from a service provider device; parsing and tokenizing an incoming service request received in a supported message format into a universal message format for processing by a message processing device; and building an outgoing service request to the service provider device using the universal message format, wherein each of the outgoing service request is in a message format supported by the service provider device.

The method may further include performing a message risk assessment on the incoming service request.

The method may further include assigning a transaction risk value to the incoming service request based on the message risk assessment.

The transaction risk value may be determined based on how much personal or private information of the service requestor is exposed.

The method may further include assigning a default value if the incoming service request is a new message or an unknown message.

The method may further include assigning a first risk level for informative type financial requests that do not expose private or personal information of the service requestor, lowest risk.

There may be at least three assignable transaction risk values, and the assignable transaction risk values may include: a first risk level for informative type financial requests that do not expose private or personal information of the service requestor; a second risk level for passive financial requests which expose a limited amount of private or personal information about the service requestor that do not involve a transfer of funds; and a third risk level for requests that perform an action upon an account or personal financial holdings of the service requestor.

The method may further using an identity cache for service requests having a lower risk and using a digital identity confirmation process for service requests having a higher risk.

The identity cache may maintain an identity token cache containing currently assigned access tokens including a token lifespan and a token owner for each token.

The identity token may be a random value that stands in place or a real digital identity.

The method may further include using the digital identity confirmation process for service requests having a lower risk when the identity cache does not contain an identity for the service requestor.

The digital identity confirmation process may include performing and external call to a credential service provider (CSP) that maintains a database of publicly available access tokens and their matching digital identities.

Performing the one or more digital authentication steps to generate a security token may include submitting a digital identity and receiving a security access token.

The digital identity may be submitted by performing an external call to a credential service provider (CSP) that maintains a database of publicly available access tokens and their matching digital identities.

The security token may have a lifespan and expire after a configured length of time.

The one or more digital authentication steps may use a random number generator which determines how many digital identity factors are to be collected to re-assert a strong digital identity of the service requestor.

The one or more digital authentication steps may include performing a multi-factor authentication (MFA) process.

The MFA process may use a random selection process.

The MFA process may use any one or more of a knowledge-based factor, a possession-based factor, and an inheritance-based factor.

The knowledge-based factor may include any one or more of a password, a personal identification number (PIN), and an answer to a pre-established question.

The possession-based factor may include any one or more of a security token, a one-time password token, an employee card, a mobile device, a SIM card within a mobile device, and harvested information from one or more computer systems.

The inheritance-based factor may include any one or more of a security value, a license identification code, an IMEI mobile device code, a harvested computer information value, a fingerprint, and a biometric input.

The biometric input may be any one or more of a retina scan or iris scan, a fingerprint scan or finger vein scan, heartbeat rhythm, facial recognition, voice recognition, hand geometry, and earlobe geometry.

The message risk assessment may include assessing a risk level using at least one of a message ID of the service request and a message name of the service request.

Provided is a device for implementing the methods described herein.

Provided is a computer system for implementing the methods described herein.

Provided is a computer readable medium configured to perform the methods described herein.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

DETAILED DESCRIPTION

Figure 1:
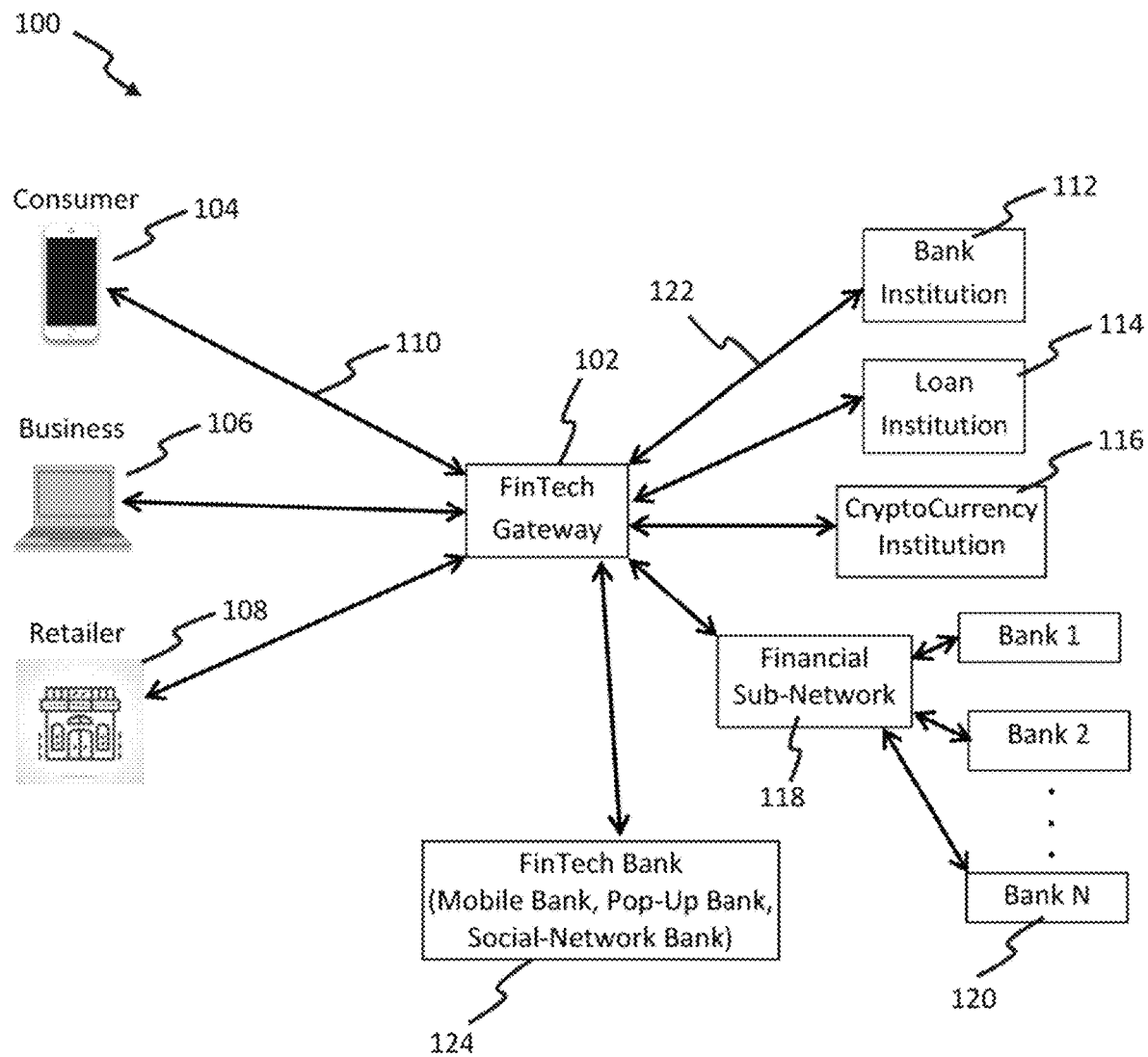
FIG. 1 is a block diagram of an example network overview of different connections supportable by a fintech gateway of the present disclosure, according to an embodiment.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

One or more systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud-based program or system, laptop, personal data assistance, cellular telephone, smartphone, or tablet device. Such systems may allow for dramatic scalability options when transaction volume increases from millions to billions of transactions. Scaling of complex server systems, especially those located in cloud computer clusters, makes dramatic growth possible and solves a myriad of complex computer problems and routing issues. Systems described herein deal with solving complex routing and parsing issues to allow such scalability to take place.

Each program is preferably implemented in a high-level procedural or object-oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

A person of skill in the art considers the problems disclosed herein and sought to be solved by the present disclosure to be exclusively computer problems and contemplates only solutions to those problems that include essential computer elements. A person of skill in the art considers abstract ideas, mere schemes, plans, rules, or mental processes that do not include computer elements to be expressly excluded from the solutions described herein.

The term "services" as used herein refers to data services between computer devices (e.g. data services provided by a service provider device on behalf of a service requester device). Such services are exclusively computer-implemented. The services may be financial services. The use of the term financial services as used herein refers to a range of monetary based transactions and product offerings, linked to identity and trust relationships between service requestors and service providers. In some embodiments, the services involve a monetary transaction, which will be linked to physical currency or digital currency and the services being requested will relate to manipulation and movement of monetary values. In other embodiments, the services might relate to a potential monetary transaction, based on trust in the service requestor and the service provider being ability to fulfill their part of a financial service agreement. Identity related to services can also have both physical and digital elements when used within a service. In some embodiments, identity might start as a physical element, like one or more multi-factor authentication elements and evolve into a digital identity made up of a token identity which is based on the physical elements. A service also involves the movement and creation of trust between computer systems in a secure way to create different levels of confidence. This helps to ensure that the service requestor and service provider are who they say they are to strengthen the integrity and successful completion of a given financial service transaction.

A transaction message or a services message can include financial services, payment or transaction information, or other message data not necessarily associated with a financial transaction and could include other transactions including message and digital identity.

Systems, methods, and devices for providing financial account services are provided. In an embodiment, the computer system provides financial services between one or more service requestor devices and one or more service provider devices. The computer system establishes links to one or more service provider devices by providing configuration to support the connection type, protocol, and format of data exchanges with each of the service provider devices that have established links. The computer system authenticates each service provider device to establish trust for data exchanges. The computer system supports the reception of service requests from one or more service requestor devices. Then, by using the configured link information, the computer system determines the type and format of service requests. The computer system transcodes the service request. The computer system permits the flow of service requests to two or more service provider devices when the configured link information is not similar.

Referring now to FIG. 1, shown therein is a block diagram illustrating a computer system 100, in accordance with an embodiment.

The system 100 includes a fintech gateway 102 which communicates with a plurality of devices 104, 106, 108, 112, 114, 116, 120, 124.

The fintech gateway 102 includes one or more cluster of computers providing a range of connection, transcoding, and authentication services.

Figure 2:
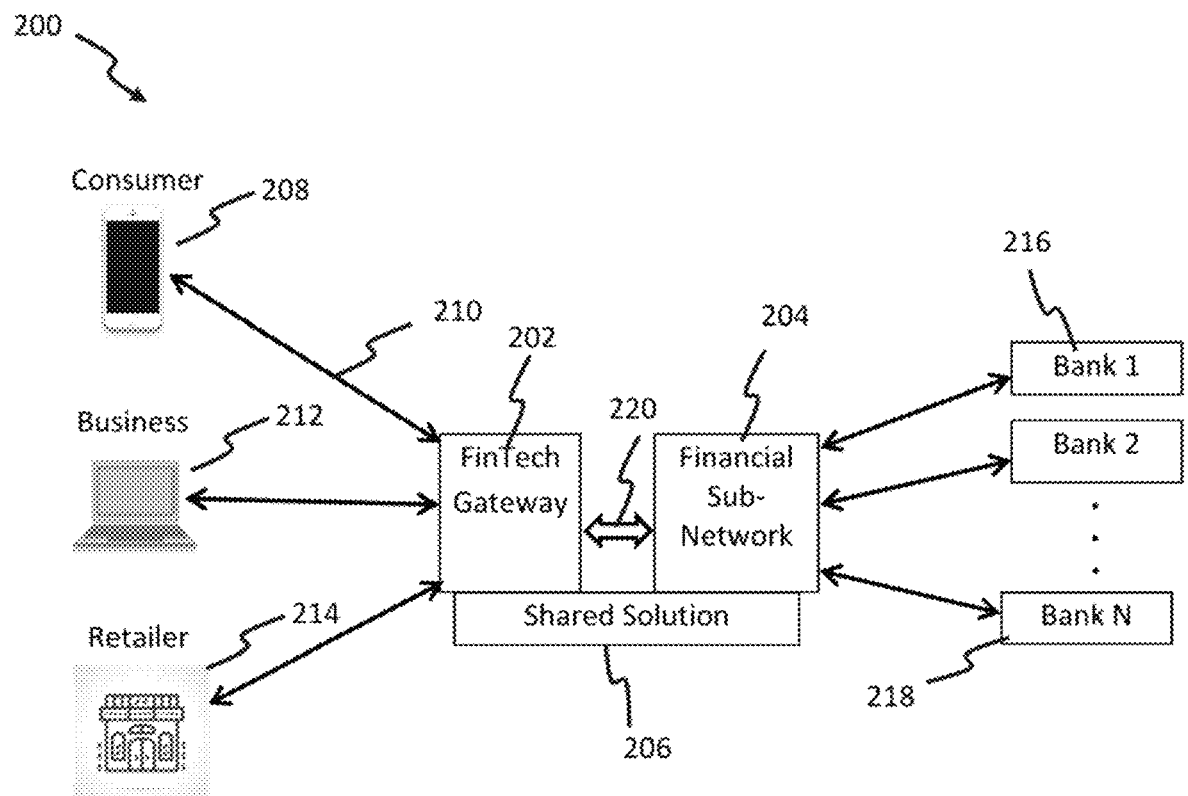
FIG. 2 is a block diagram illustrating a network overview of a fintech gateway used with a financial sub-network, according to an embodiment.
Figure 3:
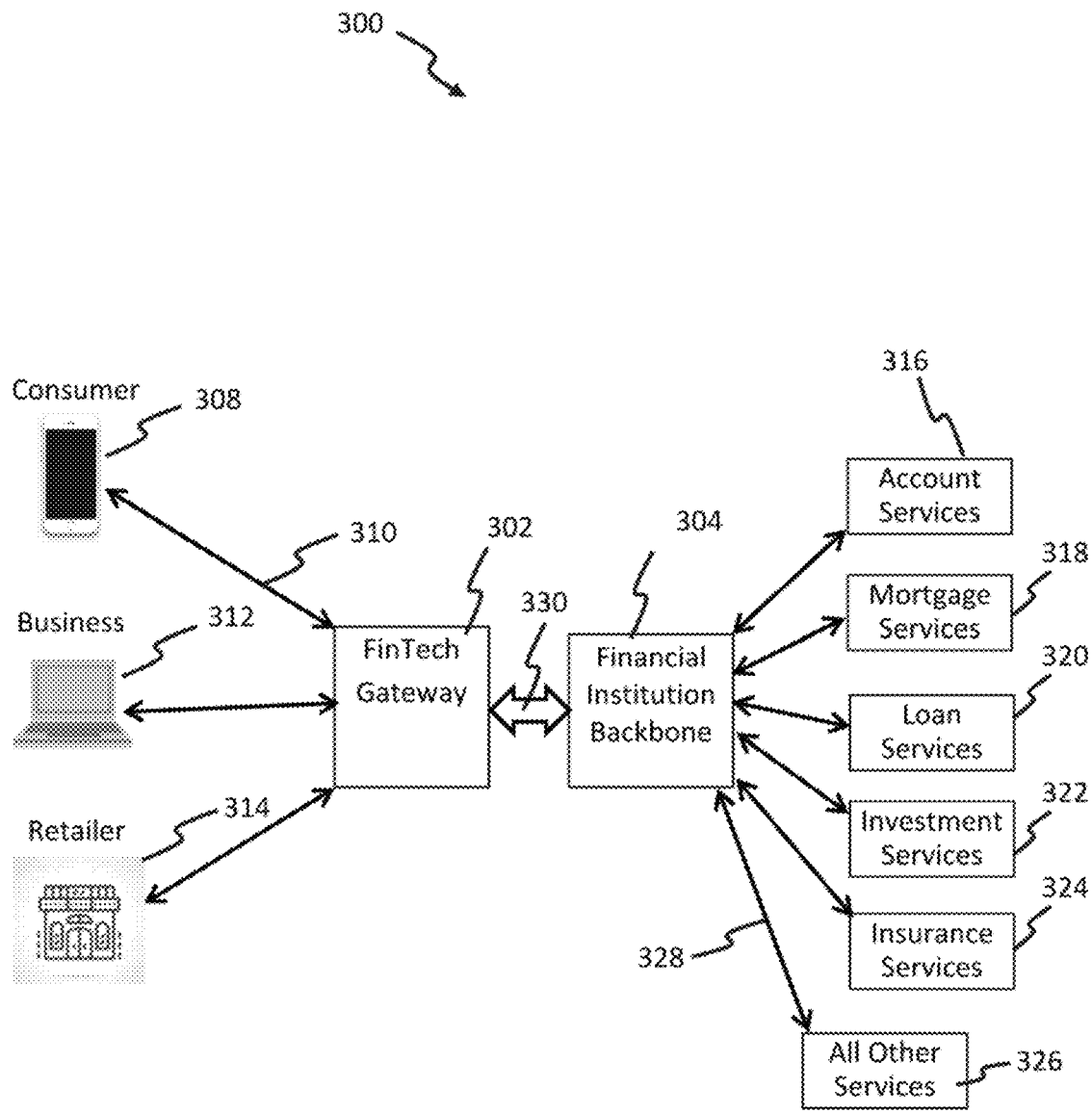
FIG. 3 is a block diagram illustrating a network overview of a fintech gateway used within a single financial institution; according to an embodiment.

These types of services can be provided as cloud computing solutions, private network offerings or even dedicated corporate or financial solutions. Some of these embodiments are illustrated in FIGS. 2 and 3.

In some embodiments, a fintech gateway 102 may be offered by a third party to reach a wide-range of financial institutions to allow 'bank shopping' for the best possible products and service offerings.

The fintech gateway 102 and devices 104, 106, 108, 112, 114, 116, 120, 124 may be a server computer, desktop computer, notebook computer, tablet, PDA, smartphone, or another computing device. The devices 102, 104, 106, 108, 112, 114, 116, 120, 124 may include a connection with a network such as a wired or wireless connection to the Internet. In some cases, the network may include other types of computer or telecommunication networks.

The devices 102, 104, 106, 108, 112, 114, 116, 120, 124 may include one or more of a memory, a secondary storage device, a processor, an input device, a display device, and an output device. Memory may include random access memory (RAM) or similar types of memory. Also, memory may store one or more applications for execution by processor. Applications may correspond with software modules or software components comprising computer executable instructions to perform processing for the functions described below. Secondary storage device may include a hard disk drive, floppy disk drive, CD drive, DVD drive, Blu-ray drive, or other types of non-volatile data storage. Processor may execute applications, computer readable instructions or programs. The applications, computer readable instructions or programs may be stored in memory or in secondary storage, or may be received from the Internet or other network.

Input device may include any device for entering information into devices 102, 104, 106, 108, 112, 114, 116, 120, 124. For example, input device may be a keyboard, key pad, cursor-control device, touch-screen, camera, or microphone. Display device may include any type of device for presenting visual information. For example, display device may be a computer monitor, a flat-screen display, a projector or a display panel. Output device may include any type of device for presenting a hard copy of information, such as a printer for example. Output device may also include other types of output devices such as speakers, for example. In some cases, device 102, 104, 106, 108, 112, 114, 116, 120, 124 may include multiple of any one or more of processors, applications, software modules, second storage devices, network connections, input devices, output devices, and display devices.

Although devices 102, 104, 106, 108, 112, 114, 116, 120, 124 are described with various components, one skilled in the art will appreciate that the devices 102, 104, 106, 108, 112, 114, 116, 120, 124 may in some cases contain fewer, additional or different components. In addition, although aspects of an implementation of the devices 102, 104, 106, 108, 112, 114, 116, 120, 124 may be described as being stored in memory, one skilled in the art will appreciate that these aspects can also be stored on or read from other types of computer program products or computer-readable media, such as secondary storage devices, including hard disks, floppy disks, CDs, or DVDs; a carrier wave from the Internet or other network; or other forms of RAM or ROM. The computer-readable media may include instructions for controlling the devices 102, 104, 106, 108, 112, 114, 116, 120, 124 and/or processor to perform a particular method.

In the description that follows, devices such as devices 102, 104, 106, 108, 112, 114, 116, 120, 124 are described performing certain acts. It will be appreciated that any one or more of these devices may perform an act automatically or in response to an interaction by a user of that device. That is, the user of the device may manipulate one or more input devices (e.g. a touchscreen, a mouse, or a button) causing the device to perform the described act. In many cases, this aspect may not be described below, but it will be understood.

As an example, it is described below that the devices 104, 106, 108, 112, 114, 116, 120, 124 may send information to the fintech gateway device 102. For example, a consumer user using a consumer device 104 may manipulate one or more input devices (e.g. a mouse and a keyboard) to interact with a user interface displayed on a display of the consumer device 104. Generally, the device may receive a user interface from the network (e.g. in the form of a webpage). Alternatively, or in addition, a user interface may be stored locally at a device (e.g. a cache of a webpage or a mobile application).

Fintech gateway 102 may be configured to receive a plurality of information, from each of the plurality of devices 104, 106, 108, 112, 114, 116, 120, 124. Generally, the information may comprise at least an identifier identifying the user. For example, the information may comprise one or more of a username, e-mail address, password, or social media handle.

In response to receiving information, the fintech gateway 102 may store the information in storage database. Generally, the storage database may be any suitable storage device such as a hard disk drive, a solid-state drive, a memory card, or a disk (e.g. CD, DVD, or Blu-ray etc.). Also, the storage database may be locally connected with fintech gateway 102. In some cases, storage database may be located remotely from fintech gateway 102 and accessible to fintech gateway 102 across a network for example. In some cases, storage database may comprise one or more storage devices located at a networked cloud storage provider.

The business device 106 may be associated with a business account. The retailer device 108 may be associated with a retailer account. The bank institution device 112 may be associated with a bank institution account. The loan institution device 114 may be associated with a loan institution account. The cryptocurrency device 116 may be associated with a cryptocurrency account. The financial sub network 120 and associated network of bank devices 120 may be associated with corresponding bank accounts. The fintech device 124 may be associated with a fintech account.

Any suitable mechanism for associating a device with an account is expressly contemplated. In some cases, a device may be associated with an account by sending credentials (e.g. a cookie, login, or password etc.) to the fintech gateway 102. The fintech gateway 102 may verify the credentials, in some embodiments determining that the received password matches a password associated with the account and in other embodiments using identity token verification, provided by credential service providers (CSP). In other embodiments, the fintech gateway 102 may implement its own credential service provider (CSP) solution using its own methods for authentication. If a device is associated with an account, the fintech gateway 102 may consider further acts by that device to be associated with that account.

In some cases, a bank may offer a fintech gateway 102 behind their own firewall (e.g. a bank firewall), similar to the illustration in FIG. 3, to provide advanced services to their customers from a wide variety of financial services. The use of firewalls for advanced protection of connections and to limit various cyber-attacks is assumed with all connections described herein. Additionally, where needed on any connection load balancing methods are assumed using various TCP, HTTP or other methods. This may include techniques such as round robin assignment, shortest-path, HTTP-headers, cookies, assigned codes, and transaction numbers to name just a few options.

The fintech gateway 102 provides a range of advanced services to improve the interaction between service requestor devices 104, 106, 108 and service provider devices 112, 114, 116, 118, 124. In many cases, the fintech gateway 102 makes such connections possible when they would have been impossible or difficult due to formats, protocols, and other such issues.

Additionally, the fintech gateway 102 is configured to control and manage issues around coordination, authentication, and timing to keep all parties involved with each transaction satisfied. Such issues may be exacerbated when dealing with different types of wireless connections from devices such as mobile phones, wearable wireless devices, tablets, and other hardware. Marginal coverage, dead-zones, and spotty coverage issues are often under-estimated when dealing with real-time transaction requirements, such as are required in electronic financial transactions. In some embodiments, the fintech gateway 102 may offer its own services created from the services available via the connections to other financial institutions. In such embodiments, the fintech gateway 102 may act as a financial service cloud offering. In such embodiments, the fintech gateway 102 may facilitate connections to service requestors and ensure the service requests they generate match what the financial institutions 112, 114, 116, 118, 120, 124 are capable of supporting, such as message parsing and formatting requirements, national and international connectivity requirements, digital identity requirements and other similar capabilities.

Acting as an agent for each side of the electronic financial transaction, the fintech gateway 102 may provide a unique, one-of-a-kind security solution. Although many of the European and international standards have attempted to specify the exact number of times an authorization and authentication procedure should be performed, the fintech gateway 102 may follow a different methodology. This approach implemented by the fintech gateway 102 follows a double randomizing pattern that randomly decides when to request re-authentication and then further randomly decides which of the two or more multi-factor authentication steps to follow. This double randomized process may further reduce advanced cyber-attacks such as man-in-the-middle attacks, replay attacks, frequency analysis attacks, phishing attacks, and many others. It is expected that as fintech services grow and start to become more and more common, the types and frequency of such cyber-attacks will increase as well. The security features and functionalities provided by the fintech gateway 102 may advantageously provide a line of defense against existing and evolving attacks.

The fintech gateway 102 provides a bridge between service requestor devices 104, 106, 108 and service provider devices 112, 114, 116, 118, 124.

Service requestor devices may be consumers 104 using smart phones, wearable technology, laptops computers, desktops computers, tablet computers, devices attached to Internet of Things (IoT) networks, or many other computing options.

Service requestor devices may be businesses 106 that are looking for solutions to provide advanced technology driving financial solutions.

Retailers 108 can be viewed as both a service requestor device and a service provider device. In system 100, the retailer device 108 is depicted as looking towards the fintech gateway 102 for services.

The service requestor devices 104, 106, 108 are connected to the fintech gateway 102 via a service requestor-gateway data communication link 110. The data communication link 110 may include many types of communication paths 110 that can be used by the service requestor devices 104, 106, 108 to reach the fintech gateway 102. Public Internet links may be used, or virtual private network links, wireless links such as WiFi or wide area cellular based solutions, direct leased lines, fibre optic connections, or many other link options. Over this data communication link 110, communications may follow standard protocols and formats, or may be custom-built and private in nature.

Security and authentication may include existing or proprietary methods with the fintech gateway 102 offering services to service requestor devices 104, 106, 108 using whatever solutions may sell best into the marketplace.

The fintech gateway 102 forms relationships with service provider devices 112, 114, 116, 118, 124.

There are examples of service provider devices provided, the first being a bank institution device 112, which may be a traditional bank institution device associated with a traditional bank institution. The bank institution device 112 may be configured to provide an application for providing banking services, such as mortgage services, credit rating services, digital and monetary account holding services, monetary transfer services, loan services, and insurance services.

The system 100 includes a loan institution device 114. The loan institution device may be a credit union device. The loan institution device 114 may be configured to provide an application for providing lending services, including obtaining loans and facilitating lending transactions. The lending transaction may be an electronic lending transaction. The application may be an electronic lending platform configured to match borrowers with lenders and/or manage or oversee the provision and repayment of loans.

The system 100 includes a cryptocurrency institution device 116. The cryptocurrency device 116 may be configured to provide an application or financial solution for providing cryptocurrency services, such as buying, selling, and converting cryptocurrency to real money.

The system 100 includes a private network or sub-network 118. The sub-network 118 hosts one or more financial institutions such as banks 120. An example of a sub-network 118 would be Interac™ in Canada. The sub-network 100 device offers the banks a unified inter-routing strategy to create a closed, private network with a single highly protected external access point. The sub-network 100 device creates a standard for new bank devices to join safely, while lowing the bar to entry and the cost of protecting the bank device's services and computer systems. In some embodiment the sub-network device 100 might also unify financial transaction exchanges and provide a testing service to ensure compliance before joining the service. The bank device 120 may be configured to provide an application for providing a wide-range of financial services, as discussed. For example, loan services, mortgage services, account and savings services, stock and trading services, investment services, to name a few.

The system 100 includes a fintech bank device 124. The fintech bank device 124 may be offered on a mobile device. The fintech bank device 124 may be used by and travel with a person of very high net worth. The fintech bank device 124 is associated with a fintech bank. The fintech bank 124 may be, for example, a pop-up bank that appears for one or more transactions and then is discontinued. The fintech bank device 124 is configured to provide an application for providing fintech banking services, which may include, for example, digital micro-loans, digital currency exchange, short-term bridge digital financing, credit rating services, digital loan services and virtual bank accounts like digital wallets, to name a few.

The system 100 includes a social-network bank device 124. The social network bank device 124 is associated with a social networking site. The social-network bank device 124 may include one or more social networking sites, such as Facebook, Amazon, Instagram, Google or other social networking site. The social networking site may offer its own banking services. The social network bank device 124 may be configured to provide an application for providing banking services using social networking services.

The service provider devices 112, 114, 116, 124 are communicatively connected to the fintech gateway 102 via a service provider-gateway data communication link 122.

The service provider bank devices 120 are collectively connected to the fintech gateway 102 via an aggregation server that are communicatively connected.

The data communication link 122 may be provided in formats following the framework established by the payment service directive (PSD2) and the regulator technical standards (RTS) regulation established in the EU.

The data communication links 122 may form the basis for a set of standard communication protocols and formats such as HTTPs, RESTful, JSON and ISO 20022, that are becoming standard methods to provide financial services.

A standard message may be an ISO 20022 message. A non-standard message be a non ISO 20022 message.

In some embodiments, the ISO 20022 message may follow an XML format In other embodiments, the ISO 20022 message may follow a JSON format over HTTP or HTTPS. In some embodiments, there may be other formats that may be added making parsing and managing these different formats more complicated.

Referring now to FIG. 2, shown therein is a computer system 200, in accordance with an embodiment. The computer system 200 may be a further example of the computer system 100 of FIG. 1. The financial sub-network 204 of FIG. 2 is a modified version of the financial sub-network 118 of FIG. 1. In this case the financial sub-network has directly coupled the fintech gateway into their service offering to camouflage it. It is coupled in a way that create efficiencies, removes slow connection links, increases security and allows for specialized customization.

The computer system 200 includes a fintech gateway 202. The fintech gateway 202 may be the fintech gateway 102 of FIG. 1. The fintech gateway 202 is linked via a gateway-sub-network data communication link 220 (or link 220) to a financial sub-network 204 to create a shared solution 206.

In some cases, the link 220 is at the function level, for example, similar to procedure calls. In other embodiments, the link 220 may be within a virtual private network (VPN), which may be within a facility of the financial sub-network 204.

The computer system 200 also includes bank devices 216, 218. The bank devices 216, 218 may be the bank devices 120 of FIG. 1. The bank devices 216, 218 are communicatively connected to the financial subnetwork 204 via a bank device-subnetwork data communication link 222.

Functionally, the computer system 200 may be similar to the computer system 100 but may also provide certain advantages.

'For example, by more closely coupling the fintech gateway and the financial subnetwork 204, communication link 122 can be eliminating or accelerating, using a coupling method 220. Coupling method 220 might be direct procedure calls, remote procedure calls (RPC) over gigabit and terabit internal links and even directly shared software code. The shared solution 206 allows for a simplified design and integration process, dramatically enhanced communication and data transfer speeds, reducing the time needed to authenticate financial institutions, transfer data and complete financial transactions between the connected banks 216, 218 may be reduced, and other advantages may be provided.

Since one or more bank devices 216 create the financial sub-network 204, the bank device 216 can manage the authorization and authentication requirements to provide immediate trust to those included into these private network consortiums.

In some embodiments, the fintech gateway 202 may be configured to create its own service offerings in conjunction with services offered by the connected bank devices 216, 218. In such embodiments, additional services such as comparing mortgage rates across some or all available banks, locating a bank that will extend a line of credit at XX percent, and other such broad service requests across banks (e.g. bank device 216, 218), can be provided.

The computer system 200 includes service requestor devices. The service requestor devices may include any one or more of a consumer device 208, a business device 212 and a retailer device 214. The service requestor devices 208, 212, 214 may be the service requestor devices 104, 106, 108 of FIG. 1.

The service requestor devices 208, 212, 214 are communicatively connected to the fintech gateway 202 via a service requestor-gateway data communication link 210. The communication link 210 to the fintech gateway 202 may include one or more communication methods, such as discussed in reference to FIG. 1.

The fintech gateway 202 communicates with the service provider devices (e.g. bank devices 216, 218) through the financial sub-network gateway 204. Communication may take place through procedure calls, application program interface (API) calls, remote procedure calls (RPC), or other suitable techniques.

The shared solution 206 represents a shared set of functions, memory, and activity where efficiencies can take place, either on a shared computer or a shared private network.

The financial sub-network 204 may provide subnetwork-bank device data communication links 222 to the bank devices 216 and financial institution device 218 that require private and unique access controlled (e.g. only granted) by the financial sub-network gateway 204. Often, these private network links exist as a result of older banks being typically very slow to upgrade their services and solutions as technology pushes past their existing access and connection methods.

Security and authentication towards the bank devices 216 is maintained using new or legacy methods, thus simplifying this component of the computer system 200.

Security and authentication towards the consumer device 208, business device 212, and retailer device 214 can use the described methods provided within this application. By performing random authentication towards the connected service requestor devices 208, 212, 214 the financial sub-network 204 and the fintech gateway 202 may strengthen the overall computer system 200 against certain attacks, such as man-in-the-middle attacks, replay attacks, frequency analysis attacks, phishing attacks, and many others.

Referring now to FIG. 3, shown therein there is a network overview 300 showing a computer system 300 including a fintech gateway of the present disclosure used within a single financial institution, according to an embodiment.

The system 300 includes a fintech gateway 302 and a financial institution backbone 304. The fintech gateway may be the fintech gateway 102 or 202 of FIGS. 1 and 2, respectively. The fintech gateway 302 is coupled to a financial institution's internal network backbone 304 via a gateway-network backbone data communication coupling 330. A financial institution backbone would have a range of characteristics, some unique to the financial industry. Within a completely closed virtual private network (VPN) the bank runs and manages it customers and services. Specialized routers and firewalls provide protections on outside connections and in some embodiments to financial sub-networks. In these embodiments the financial sub-networks can provide additional protections. Within the financial backbone are specialized backup and restore services for customer data to handle catastrophic disasters and failures of any part of the system. Depending on the size and scope of the financial organization, the backbone might span a city, region or countries and cover worldwide operations.

In this embodiment, a financial institution offering a variety of services can use the fintech gateway 302. The services may include, for example, account services 316, mortgage services 318, loan services 320, investment services 322, insurance services 324, and other financial services 326. The services 316, 318, 320, 322, 324, 326 may be provided on a variety of computer systems, hardware, and legacy computer systems that make the level of integration provided by the fintech gateway 302 and computer system 300 advantageous.

Functionally, the computer system 300 may be similar to the computer systems 100 and 200 of FIGS. 1 and 2, respectively, but may also provide certain advantages. For example, by coupling the fintech gateway 302 into the financial institution backbone 304 via the coupling 330, efficiency, ease of use, and control over the overall computer system 300 operation may be increased.

The coupling 330 may be direct procedure calls, remote procedure calls (RPC), high-speed direct ethernet links, VPNs, or many other efficient and high-speed coupling methods.

Often, a financial institution associated with/implementing the financial institution backbone 304 wants a great level of control to implement higher levels of security and firewall protection. Adding services dynamically to the computer system 300 also becomes easier when a financial institution backbone 304 of one financial institution controls the entire system 300 for the outside world (i.e. devices 308, 312, 314).

In some embodiments, the fintech gateway 302 may present the services 316, 318, 320, 322, 324, 326 through a common master web interface to the service requesting devices 308, 312, 314. Additionally, when different divisions of a specific financial institution offer similar services it may also be possible to create competitive service offerings. One such example may be if the mortgage services division 318 and the loan services division 320 of the same company each extended lines of credit against a pre-existing asset such as a home. One such example may be if the mortgage services 318 and loan services 320 each extend lines of credit on a pre-existing asset such as a home.

In the embodiment of FIG. 2, the financial institution associated with the financial institution backbone 304 is offering services to many service requestor devices 308, 312, 314.

In some examples, the service requestor devices may include any one or more of consumer devices 308, business devices 312, retailer devices 314, and many other types computer systems and devices associated with many other types of organizations, users, or service requestors.

For example, consumers using various computer devices 308, may be attracted to a financial institution for account services 316 and other services, (e.g. to support their bank accounts and hold money they earn and spend).

Businesses using various kinds of devices 312 may be attracted to a financial institution for loan services 320 and other services (e.g. to support acquiring money on credit for business operations).

Retail operations using various kinds of devices 314, may be attracted to a financial institution for insurance services 324 and other services (e.g. to protect them from harm and injury of the products and services they offer to consumers).

Each of the service requestors 308, 312, 314 may be evaluating the services 316, 318, 320, 322, 324, 326 offered by financial institutions and looking for the best quality and price for the services being requested.

The service requestor devices 308, 312, 314 are communicatively connected to the fintech gateway 302 via a service requestor-gateway data communication link (which may be similar to link 110 of FIG. 1).

Service requestor devices 308, 312, 314 may use various communication methods to connect to the fintech gateway 302 via the link 310, several of which have been discussed in reference to FIG. 1. Options may include, for example, wireless RF links, high speed RF links over WiFi networks, direct lines and lease lines, and many links over public networks like the Internet.

The fintech gateway 302 communicates with and provides access to the financial institutions services 316, 318, 320, 322, 324, 326 through the financial institution backbone 304. This may take place through procedure calls, application program interface (API) calls, remote procedure calls (RPC), proprietary older methods like X.25, or many other ways. The coupling of the gateway 302 and financial institution backbone 304 may also include a shared set of functions, memory, and activity where efficiencies can take place, either on a shared computer or a shared private network.

The financial institution backbone 304 communicates with a plurality of service provider devices 316, 318, 320, 322, 324, 326 via a backbone-service provider device data communication link 328. The financial institution backbone 304 may provide links 328 to a wide range of products and service devices 316, 318, 320, 322, 324, 326.

In some embodiments, the links 328 use very old technology to connect with legacy mainframe computer systems (e.g. all other services 326).

In other embodiments, the links 328 may be over gigabit network technologies with advanced routers, network switches, and virtual private networks (VPNs).

Creating the coupling 330 between the fintech gateway 302 and the financial institution backbone 304 does not eliminate any other connection methods previously supported. Such legacy connection solutions are not shown in FIG. 3 but may exist to allow legacy server requestor devices to remain unchanged (until they are ready for change). In some embodiments, when this level of integration is implemented, security and authentication is handled by the fintech gateway 302. In such embodiments, the resource server that hosts the user accounts and the authorization server that verifies the digital identity of the user trying to access the account can be hosted by the fintech gateway 302. This may allow for integrated support for OAuth 2.0 requirements for confirming digital identity across several services when the fintech gateway 302 is not the only financial service provider being used by the account holder. These various embodiments are further highlighted in the figures that follow.

Figure 4:
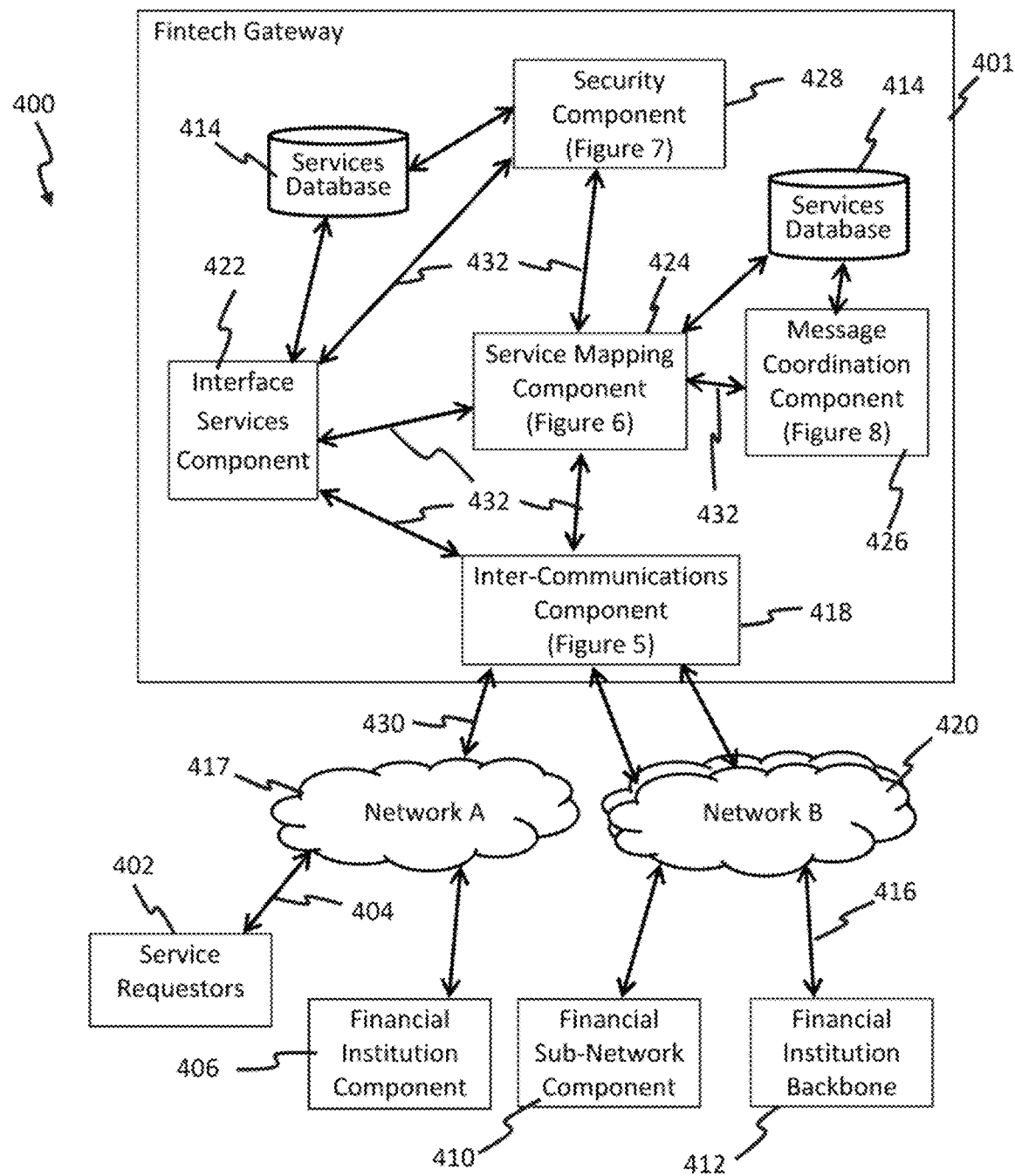
FIG. 4 is a block diagram illustrating a plurality of elements of the fintech gateway, according to an embodiment.

Referring now to FIG. 4, shown therein is a computer system 400 including a fintech gateway 401 in accordance with an embodiment. The fintech gateway 401 may be the fintech gateway 102, 202, 302 as discussed with reference to FIGS. 1, 2 and 3, respectively. The fintech gateway 401 includes a plurality of software components or modules which, when implemented by the fintech gateway 401, cause the fintech gateway to provide the various features and functionalities described herein.

The fintech gateway 102, 202, 302 implements a computer-implemented method to connect financial service requestor devices and financial service provider devices.

The fintech gateway 401 provides a set of services. The set of services provided by the fintech gateway 401 may depend on what is provided by each financial institution (e.g. bank devices, financial institution devices) and how the fintech gateway 401 is coupled into the overall system. There are many embodiments for this coupling, with three embodiments provided in FIGS. 1, 2 and 3. These are just three embodiments and many others are also possible, including hybrid systems that combine elements from FIGS. 1, 2, and 3.

The computer system 400 includes service requestor devices 402 and service provider devices 406, 410, 412. For ease of use, the service requestors 402 and service providers 406, 410, 412 include data communication connections 404, 416 to one or more networks 418, 420. The connection 416 may be, for example, VPN connections 416, an RPC connection 416, or direct procedure calls 416.

The computer system 400 includes network A 418 and network B 420. Network A 418 and Network B 420 are not meant to imply that direct procedure calls, RPC or even software mobile calls between the fintech gateway 401 and the service provides 406, 410, 412 is not possible or supportable. In some embodiments, internal API type calls may also be used to reach financial services and be linked within the same computer system.

The services offered on computer devices run by financial institutions 406, 410, 412 may include, for example, comparison loan shopping, finding the best mortgage rates, locating an ideal bank account, and transferring money between two parties seamlessly, and similar services. These are just a few of the many possible services that may be offered to consumers, businesses, and retailers acting as service requestors 402 using various types of devices. Some of these examples will be further highlighted as each of the support services components of the system (e.g. devices 406, 410, 412) are explored. In other embodiments, the fintech gateway 401 may package the services offered by the connected financial institutions 412 to create its own set of services. Hybrid service offerings are discussed in reference to FIG. 4 and further in FIG. 5.

In some embodiments, the data communication connections to and from the outside (e.g. devices 402, 406, 410, 412), such as data communication connections 404, 416, 430, may include various firewalls and protections. Such firewalls and protections are not shown in FIG. 4 but assumed present in the computer system 400 as needed. Also, basic routers and connection endpoints for Internet Service Providers (ISPs) are part of basic data communication interconnection requirements.

Figure 6:
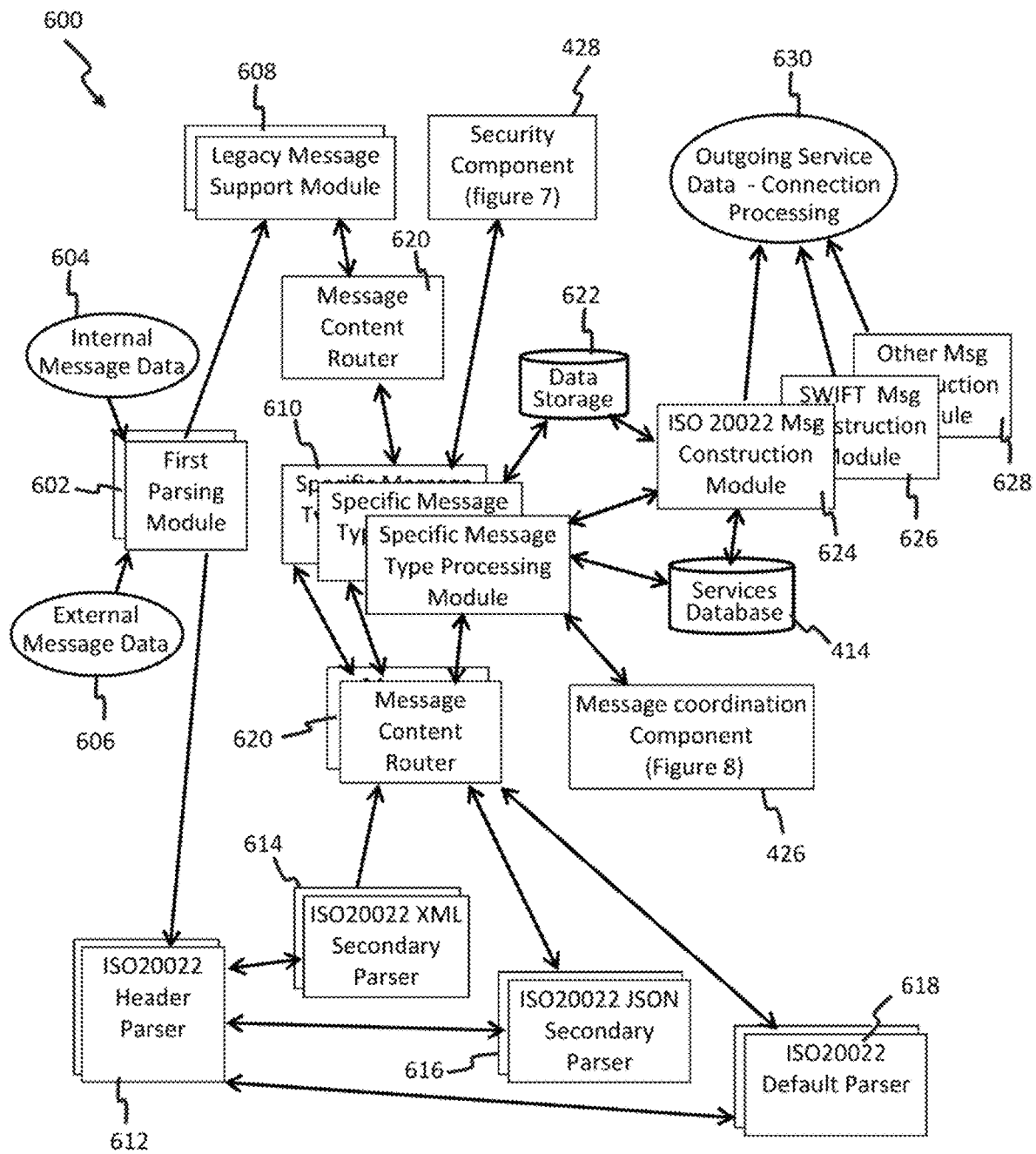
FIG. 6 is a block diagram of elements of the service mapping component of FIG. 4, according to an embodiment.
Figure 7:
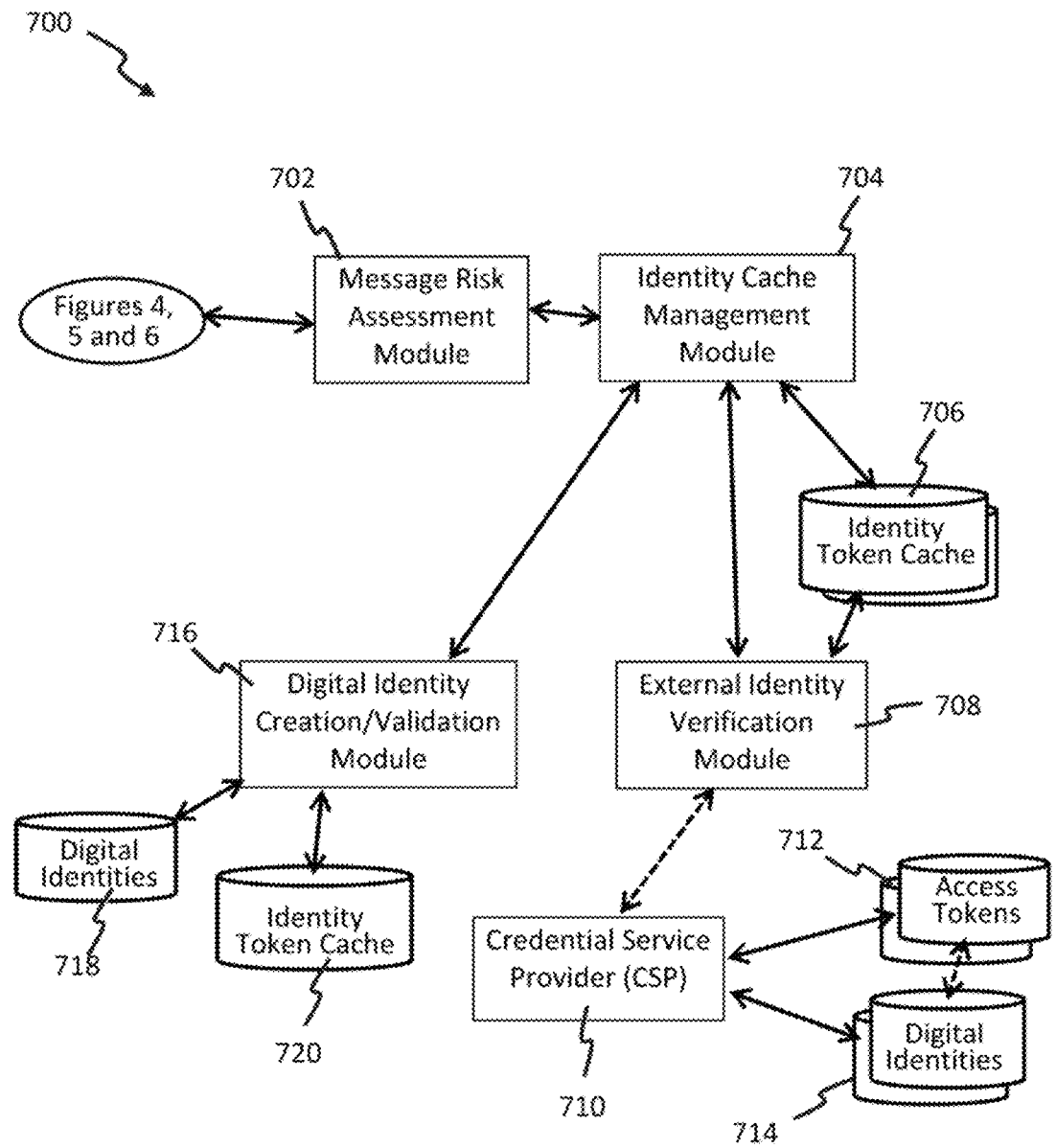
FIG. 7 is a block diagram illustrating elements of the security component of FIG. 4, according to an embodiment.

The fintech gateway 401 includes an inter-communications component 418 (described in more detail in FIG. 5), an interface services components, a service mapping component (described in more detail in FIG. 6), a message coordination component (described in more detail in FIG. 8), and a security component 428 (described in more detail in FIG. 7).

The fintech gateway 401 includes internal data communications 432 between the interface services component 422 and the inter-communications component and between the service mapping component 424 and the inter-communications component 418.

The Internal communications 432 may be API calls, procedure calls, direct software code execution, remote procedure calls (RPC). In a massively distributed environment, the internal communications 432 may be made over TCP/IP to another machine for speed and distributed computing reasons. In various network topologies, different components such as the security component 428 may make connections to unsecure networks for security token verification services, for example. Any of these connections when traversing outside of a virtual private network (VPN) may require the use of firewalls, network routing equipment, and other wide-area networking mechanisms.

Initially, service requests arrive via a communication path 404 from a service requestor device 402. The service requestor device 402 may be a wide range of consumer devices, business devices, and/or retail devices, such as described in FIGS. 1, 2, and 3.

As discussed, communication path 404 may be over a public network like the Internet (e.g. network A 417), a private link, a leased line, or even a wireless link (e.g. Network B 420).

In some embodiments, legacy connections for older services such as SWIFT or NACHA may require dedicated leased lines to carry their payload data securely. These connections may be routed to the inter-communication component 418 (further described in reference to FIG. 5).

The inter-communication component 418 determines if a direct financial services message is being received or whether a user interface request 422 is present for directly offered web services.

Different fintech gateway 401 implementations may be run within a given company, publicly, or even as part of a wireless network offering.

The fintech gateway 401 may be integrated into a large social network company such as Facebook, Amazon, Apple, or Google.

The Interface Services Component 422 provides an interface to user devices utilizing thin clients. In some embodiments, this may be an Internet web browser interface, a custom-built app (application) running on a cell phone, or a proprietary interface. Browser HTML pages written with advanced software products such as React or Angular can also provide user interface input and data values for users making service selections. Such apps are commonly downloaded from app stores like Apple's App Store and Google's Play Apps.

The Interface Service Component 422 also provides initial interactions for becoming a trusted member of the fintech gateway's 401 network of connected users.

The initial interaction includes establishing authentication and authorization. The fintech gateway 401 uses the security component 428 to perform authentication and authorization functions. The security component 428 is further discussed in reference to FIG. 7.

Once a user is authenticated by the security component 428, the user can then be authorized to use the services provided. Th authorization process may broadly follow the European regulatory technical standard (RTS) for strong customer authentication (SCA) regulation. Further details on the connection methods and steps are provided in subsequent figures.

In some embodiments, the interface service component 422 provides menus and choices for hybrid services offered by the fintech gateway 401. In such embodiments, a menu, such as an HTML web page, may be presented which includes service choices, financial institution selections, and other possible service presentations. The number and type of these service offerings are limited only by the imagination of the fintech gateway creator.

Initial steps of the strong customer authentication (SCA) process implemented by the security component 428 may use HTTPs connection methods to first validate a user. In one embodiment, this may be performed through login and password methods. In another embodiment, this may be performed using transport level security (TLS), OAuth 2.0, and additional security mechanisms that form a multi-factored authentication (MFA) process.

In some embodiments, the user may have already supplied their digital identity to a credential service provider (CSP) and received a security token in exchange. In such embodiments, the security token is provided to the fintech gateway 401 and processed by the security component 428.

Once a connection has been established after an authentication and connection sequence, or a login, password sequence or a digital identity verification process, the user may be considered a known user with rights in the fintech gateway 401. At this stage, the user may review and navigate to the service they wish to use.

When messages received by the fintech gateway 401 are not HTML-type user interactions, these messages are directed to the service mapping component 424 (further described in reference to FIG. 6).

The service mapping component 424 uses the message coordination component 426 to provide additional computer services to manage a number (which may be growing and complex) of financial service requests and responses. The message coordination component 426 is further described in reference to FIG. 8.

The service mapping component 424 also uses the security component 428 to perform security protocols, such as OAuth 2.0, when API calls are used and digital authentication services are needed.

The Security Component 428 may act as a gatekeeper of the fintech gateway 401 service offerings and access to connected financial institutions 406, 410, 412. The security component 428 will use the services database 414 to identify and determine the level of security needed with each financial institution 406, 410, 412.

In some embodiments, the Security Component 428 receives a security token and uses advanced caching methods and external credential service providers (CSP) to confirm a requestor's digital identity.

For example, one or more financial institutions may use a common resource server to protect their user accounts and issue access tokens on behalf of those users.

In such embodiments, a digital identity has been initially established using an access token first provided by a CSP.

The digital identity is then bound to other service providers such as the fintech gateway 401.

The fintech gateway 401 uses the access token to gain access to the user's accounts at one or more of the financial institutions the user has an existing relationship with. This access token method is described in greater detail in reference to FIG. 7.

In other embodiments, the Security Component 428 is configured to harvest information from one or more computer systems. The security component 428 may use a local application running on the service requesting device to perform the information harvesting. These service requesting devices may include a laptop computer, a point of sale device, desktop computers, mobile computers, wearable computers, tablet computers, and other systems and devices.

Running a local application may harvest information from the computer system which can be used as part of a multi-factored authentication process performed by the security component 428.

Harvested information may include, for example, computer serial numbers, license codes, international mobile equipment identifier (IMEI), SIM identity values, and other such values to name a few.

The security component 428 may also collect biometric data such as facial recognition data, fingerprint data, and other such biometric data. The biometric data may be collected by a local application running on the service requestor device.

The objective such information (e.g. harvested device information, biometric information) gathering processes performed by the security component 428 is to collect two or more elements of information which can form a basis for a strong multi-factored authentication solution implemented by security component 428.

The two or more elements of information for use in the multi-factored authentication solution may include information a person or computer knows (knowledge-based information), something a person or a computer possesses (possession-based information), and/or some characteristic or property of a person or a computer system (inheritance-based). The inheritance-based information may be a physical or physiological characteristic or property.

The application of a multi-factored authentication process by the security component 428, including the collection of the information elements, may help thwart advanced cyber threats such as a man-in-the-middle attack, a replay attack, a frequency analysis attack, a phishing attack, and many other forms of cyber-terrorism acts.

In some embodiments, the fintech gateway 401 issues a security token. The security token includes a duration period. The duration period may promote the service requesting device 402 to make use of the token for faster and more efficient operation.

In this embodiment, whether or not a security token is issued, the fintech gateway 401 implements methods (e.g. advanced methods) to randomly ask for two or more authentication information elements. This may help ensure the legitimacy of the digital identity of the service requestor Once trust and authentication are established between a service requestor and the fintech gateway 401, a custom client may be used in some embodiments to streamline the interface to the user. In such embodiments, where a custom financial services client has been provided to the user, advanced OAuth digital identify methods can be used to pre-establish identity for the fintech gateway 401. In these embodiments the customer client can immediately start to use financial service API calls that build ISO-20022 compatible messages.

When using direct API calls, it is assumed that computer-to-computer communication is taking place, which may include using protocols such as JavaScript Object Notion (JSON) or XML over HTTP and HTTPs. In such embodiments, a software interface for the user may be customized to enhance speed and efficiency. In some embodiments, this may lead to a direct application program interface (API) where one or more API calls establish which service the user who wishes to use and provide the parameters the service needs. In some cases, the user may start using the Interface Services Component 422 but then transition to direct API calls and use the service mapping component 424 directly.

In some embodiments, the interface service component 422 validates the incoming user (service requestor) and provides encryption services through an API using Transport Layer Security (TLS). The services database 414 provides the information to understand all aspects of the available services, the connection requirements and message format requirements.

The services database 414 contains the necessary information for the user to understand the service and for the fintech gateway to understand how to communicate with the various services. The following table shows example information that may populate the services database 414, according to an embodiment:

TABLE 1

Example Services Database

| Service Provider | Service Name | Service Details |
|---|---|---|
| Royal Bank | | |
| | Credit Card Services | Link: Connection A-22<br>Payload: ISO20022 JSON Version 2<br>Service Identity: 24 hour validity |
| | Personal Account Services | Link: Connection A-22<br>Payload: ISO20022 JSON Version 1<br>Service Identity: 24 hour validity |
| | Business Account Services | Link: Connection A-22<br>Payload: ISO20022 JSON Version 1<br>Service Identity: 48 hour validity |
| | Mortgage Services | Link: Connection A-21<br>Payload: ISO20022 JSON Version 2<br>Service Identity: 48 hour validity |
| CIBC | Credit Card Products | Link: Connection A-20<br>Payload: ISO20022 XML<br>Service Identity: 24 hour validity |
| | Personal Banking Products | Link: Connection A-20<br>Payload: ISO20022 XML<br>Service Identity: 24 hour validity |
| | Business Banking Products | Link: Connection A-20<br>Payload: ISO20022 XML<br>Service Identity: 24 hour validity |
| | Personal Mortgage Products | Link: Connection A-20<br>Payload: ISO20022 XML<br>Service Identity: 24 hour validity |
| | Personal Loan and Credit | Link: Connection A-20<br>Payload: ISO20022 XML<br>Service Identity: 24 hour validity |
| ... | ... | ... |

This is a truncated view of one embodiment for the contents in the service database 414. In other embodiments additional information may be present. For example, there may be additional qualifiers to the Service Name including a sentence to help promote the service to the Service Requestors looking for new services. The service details assist with routing to the correct Connection Manager to reach the service and the required format that a given service is expecting for its payload. With this example, a given Service Provider may have some older and newer services available through the fintech gateway. Older services may have one format of financial message, while newer services may have an updated format of financial message.

In some embodiments, OAuth 2.0 may be employed to add additional authentication and digital identity verification in the security component 428. Such an approach may be used, for example, in embodiments where TLS security may not be sufficient.

The service requestor device 402 could support additional multi-factor authentication (MTA). This support would be built into a custom client to include MFA measures around inheritance-based information elements and measures. Inheritance-based information elements and measures may include, for example, biometric security measures and machine-specific information measures. Biometric security measures may include, for example, fingerprint challenges, eye scanning, or other biometric techniques based on physical or physiological characteristics or properties of a user. Machine-specific information measures may include, for example, computer information harvesting. Computer information harvesting may include, for example, security values, license identification codes, IMEI mobile device codes, or many other possible machine values to be used for MFA.

The service requestor device 402 provides service request data to the fintech gateway 401. Service request data may have many forms. In some embodiments, the service request data may include any one or more of bank account numbers, bank transit numbers, destination bank names, or the like such as routing data or service provider data. Personal data includes customer numbers, driver's license numbers, address and phone numbers, digital identity and values to identity the person. In some embodiments, the service request data may include any one or more of personal data, credit data (e.g. credit rating), a loan or mortgage request amount, and other parameters. The service request data may depend on the requested service.

In some embodiments, even after point-to-point authentication has been established, security certificates and authentication values may be passed along to the service mapping component 424. The security certificates and authentication values can be included with the service request to the financial institution device (e.g. 406, 410, 412).

After the incoming service request message has been initially processed by the inter-communication component 418, the service mapping component 424 sets up the transactional elements of the information and steps to be completed in the financial transaction exchange. This may include assigning a transaction value for the service request. This may include determining which of the message coordination components 426 is needed for the service request. For example, in one embodiment, the message coordination component 426 may be used to help with service requests that need to be split into multiple service requests to multiple financial institution devices.

For example, the message coordination component 426 may be used where a consumer-user (service requestor 402) wants to look at many different mortgage options and rates. Multiple service requests are sent out and responses to the requests are coordinated by the message coordination component 426 when the responses return into one unified response to the consumer device (service requestor 402).

The service mapping component 424 uses the message coordination component 426 to perform any one or more of splitting the service request, setting up a timer for each new service request, and assembling a service responses (after having split the service request). The service database 414 provides additional information about each service to guide in the splitting of the message and construction of the service request.

As service responses are received by the fintech gateway 401 from service providers 406, 410, 412, synchronization of the service responses is used. Synchronization may help to keep track of which service responses have been issued and which service responses are outstanding (remain to be issued). The message coordination component 426 may include a service which provides a state driven engine for helping ensure the flow of data is correct and nothing is missing. State diagrams are driven by events that transpire through message flows between the service requestor 402 and service providers 406, 410, 412. If a certain event has not taken place the message exchange for a given financial transaction would be considered incomplete and pending steps. If a timer were to expire before reaching a certain state, then the financial transaction might be considered a failure and would be aborted.

The service mapping component 424 goes to the service database 414 to extract the necessary service provider descriptions it needs for a given financial transaction.

The descriptions within the service database 414 enable parsing and processing that follows the correct API standard used by the service provider. This may include following any one or more of the Berlin Group's NextGen PSD2 format, the French Banking Federation (FBF) API standard driven by the bank owned STET company, OpenID's Financial-grade API (FAPI), the Open Banking Standard from the United Kingdom, the Financial Data Exchange's Durable API (DDA) standard, and the PolishAPI standard.

The fintech gateway may follow the matching API or interface as defined by a given financial institution (service provider). The matching API or interface may be provided the service description for the given financial institution.

In some embodiments, the service mapping component 424 may have to transcode the incoming service request message to a format that is internal and proprietary to a specific financial institution (service provider). For example, if coupled to a financial institution backbone 412, the service mapping component 424 may make direct procedure calls to retrieve necessary response information before building a matching (i.e. correct) service response that is compatible with the original request.

In another example, a customer (service requestor 402) may want to look at loans available across a plurality of financial institutions (service providers). This embodiment represents a hybrid service offering that may be provided by the fintech gateway 401 with a plurality of financial institution connections. In some cases, the plurality of financial institution connections may be numerous.

As the customer has signed up with a fintech gateway 401 of their choice, the customer can establish a relationship and gain access to the custom financial services the fintech gateway 401 offers. Establishing a relationship might require several steps. In some embodiments, establishing a relationship includes signing up, paying a monthly cost and receiving a login/password access code. In other embodiments, establishing a relationship includes downloading a custom client that works with the fintech gateway 401 and exchanging a digital identity using OAuth 2.0 or some other protocol.

By using a web browser interface or a custom client that uses an API interface, the service requestor can be presented a range of services and their capabilities. As each service is presented the parameters for the service request are gathered before submitting the request to one or more service providers.

The fintech gateway 401 may use personal information to confirm the identity of the customer (service requestor). Such personal information may include, for example, a customer monthly income range, a customer age, a loan amount, a loan purpose (i.e. the purpose of the loan), current financial institutions with which the customer has an existing relationship, or other parameters.

Once collected, the customer personal information is provided to the service mapping component 424. The service mapping component 424 may use the message coordination component 426 to determine how many financial institutions (service providers) and which financial institutions (service providers) to use for the service request. In some cases, the service mapping component 424 may immediately go to the message coordination component 426 for performing such functions once the customer personal information is received.

In an embodiment, the user may have already been presented with or given a pick-list of financial institutions (service provider) offering a loan quoting service. The pick-list is populated using information from the services database 414 that contains a list of all service provides and what services they provide. The user may decide to look into a subset of the financial institutions on the pick-list (e.g. 5 to 10 financial institutions). The user pick list may be provided to the service mapping component 424 and passed to the message coordination component 426.

Based on the number of financial institutions 'N' that have been selected to provide a loan quote service (i.e. the subset of the pick-list), the message coordination component 426 returns 'N' similar service requests to the service mapping component 424 (e.g. in place of one).

In some embodiments, the message coordination component 426 may set a timer for each service request (e.g. each of the N service requests generated by the message coordination component 426). As a result, if a financial institution (service provider) fails to respond to a service request within a given timeframe (e.g. determined by the timer set by the message component 426), the assembly or generation of the final presentation of the service response to the user (service requestor) may proceed in a timely fashion. In some cases, the delinquent service response (i.e. failure to respond in accordance with the timer) may be excluded from the final presentation of the service response.

With the service requests generated, the service mapping component 424 replies upon the requirements of each service to determine when a service request has been completed. In some cases this means establishing timers to ensure each stage of the transaction exchange is complete on time and that no steps are missing. In other cases it could be collecting a set of responses and ignoring those service providers that do not respond in time.

For example, in some embodiments, a given financial institution (service provider) may require additional information. For example, if a service requestor were looking for mortgage rates the service provider might need to know what term length or amortization the service requestor was interested in. The financial institution device 406, 410, 412 may send a follow-on request for the additional information through the fintech gateway 401. The timer subsystem, further described in FIG. 17, keeps track of all exchanged service requests and service responses until the required steps are complete. Each supported financial transaction type will have an exact profile of the messages that must be exchanged to consider it fully complete. In some embodiments, such additional steps may be more likely when performing advanced payment services or money exchange services between individuals. In these service requests, additional steps may be used to ensure the funds are present before payment and money transfers can take place between financial institutions (via the financial institution devices).

Figure 5:
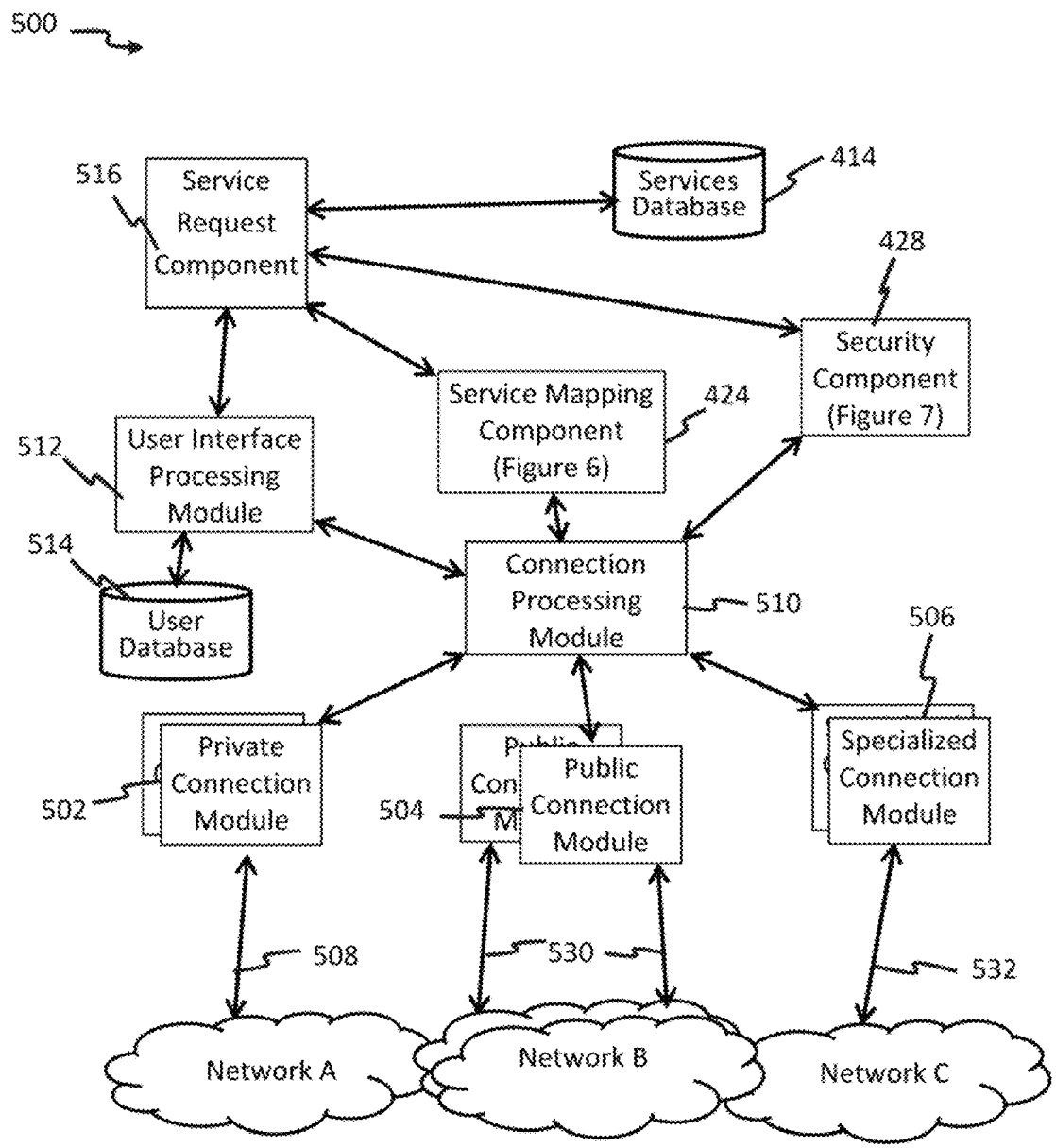
FIG. 5 is a block diagram illustrating elements of a the interface services component and the API component of FIG. 4, according to an embodiment.

Referring now to FIG. 5, shown therein is an illustration 500 of the elements within the interface services component (e.g. interface service component 422 of FIG. 4) and the Inter-communications component (e.g. Inter-communications component 418 of FIG. 4) introduced in the fintech gateway 401 of FIG. 4.

Connections 508, 530, 532 arrive into various connection modules 502, 504, 506 found within the fintech gateway 401 from various types of networks and links (e.g. Network A, Network B and Network C). As discussed in FIG. 4, these connections may be over physical networks, virtual private networks, direct leased lines, function calls, or any of a wide range of data communication methods for exchanging messages.

The fintech gateway 401 includes one or more specific connection modules 502, 504, 506. A given specific connection module 502, 504, 506 is configured to process a particular type of connection 508, 530, 532. The specific connection modules 502, 504, 506 include a private connection module 502, a public connection module 504, and a specialized connection module 506. The various connections 508, 530, 532 are processed by the specific connection modules 502, 504, 506, which provide specialized processing options for the particular connection types.

The fintech gateway 401 includes a connection processing module 510. In some embodiments, the connection module 502, 504, 506 may perform its connection processing and transfer received information to the connection processing module 510.

The connection modules 502, 504, 506 are shown as redundant and it may be assumed that any module or component may have a redundant, fault-tolerant, and load-balancing system design.

In other embodiments, certain connection modules 502, 504, 506 may have a specialized function or behavior that may affect an overall outcome of the system and each financial transaction that runs over that connection type 508, 530, 532.

The redundant modules for connection modules 502, 504, 506 may also provide options for managing protocol differences between using an HTTP (Hyper-text Transfer Protocol) over TCP/IP methodology and another connection strategy that may use a proprietary or obscure protocol methodology.

In some cases, direct leased lines (e.g. which could be supported through a private connection module 502) may be used to maximize security and create a closed system between a retailer, a financial service provider, and the fintech gateway 102, 202, 302.

Leased lines may be used with legacy solutions, such as those that use SWIFT (the Society for Worldwide Interbank Financial Telecommunications), or ACH message following the NACHA format from the USA, or EDIFACT format following the United Nations rules for Electronic Data Interchange or perhaps SEPT the Single Euro Payments Area, or many others.

In some embodiments a specialized connection module 506 utilizes one or more devices to facilitate a connection 532 to an advanced system. The advanced system may be a satellite product offering. In such embodiments, a specialized device 506 may be needed to facilitate the unique protocol needs and timing requirements with low-orbit or high-orbit satellite devices. Satellite connections are known to have high round-trip times and capacity allocation algorithms must be taken into consideration through advanced software programming. When using a satellite connection method with its unique requirements (e.g. connection 532), it may be necessary to include issues like latency, round-trip delays, and slot allocation requirements into the control data used with each information exchange.

Each connection module 502, 504, 506 may include a quality-of-service (QOS) module. The QOS module monitors round trip message delays to indicate real-time changes to throughput and latency.

In some embodiments, when a change in QOS is detected, the connection module 502, 504, 506 may make one or more modifications to an HTTP/HTTPs header to indicate a satellite or cellular RF link is being utilized for a given financial transaction request and that such link is experiencing delays.

In other embodiments, an alternative connection strategy and data transfer protocol may be used which uses a proprietary specialized connection device to facilitate connection 532.

With the QOS information and connection characteristics, the service mapping component 424 may adjust timers and retry algorithms. This may promote a more successful outcome of financial transactions that are taking place over satellite or RF connections with specialized and unpredictable characteristics.

It is well-known that satellite systems are vulnerable to long latency and longer round-trip delays. The connection processing module 510 assembles the connection type, the protocol used, and other QOS information that could be valuable in assisting with successful financial transaction outcomes. The connection processing module 510 associates the assembled information with the incoming transaction.

There is a first quality of service classification and a second quality of service classification. The message processing device is configured to give financial transactions assigned the second quality of service classification longer time than financial transactions assigned the first quality of service.

The quality of service classification is determined based on a quality of service parameter. The quality of service parameter includes at least one of speed and latency. The supported connection is assigned the first quality of service classification if the quality of service parameter meets a quality of service parameter threshold. The supported connection is assigned the second quality of service classification if the quality of service parameter does not meet the quality of service parameter threshold.

The quality of service parameter threshold may include both a speed threshold and a latency threshold.

The supported connection is assigned the first quality of service classification only if the supported connection meets each of the speed threshold and the latency threshold. The supported connection is assigned the second quality of service classification if the supported connection fails to meet only one of the speed threshold and the latency threshold.

As described, the fintech gateway 401 includes a public connection module 504. In some embodiments, one or more public connection modules 504 may support a wide range of public data networks.

The public data networks may be cellular RF networks, TCP/IP based networks, such as the Internet, or other public data networks.

Connections over such public networks may use a variety of routers, switches to support specialized RF protocols, Ethernet links, 802.11 links, and other connection types 530.

Similar to the specialized connection module 506, different methods may be used to pass connection identification information and connection characteristics to the service mapping component 424.

For example, RF connections 530 are well-known to have dead-zones, poor coverage areas, and congestion areas in busy urban areas. If the service mapping component 424 receives an indicator showing the type of RF connection being used, the service mapping component 424 may adjust its timers and behaviors to maximize the success chance of the financial transaction.

Similarly, other (e.g. unconventional) connection methods 508 may need to be supported by the fintech gateway 401. Such connection methods 508 may use a private connection module 502 to support these connections 508. These connections 508 may include Internet-of-Things (IoT) connections, Bluetooth connections, WiFi connections, and other advanced connection techniques.

To manage dealing with connections with unique connection properties, the fintech gateway 401 would initially be configured to use standard timers for the exchange of messages and transactions. In other instances, in which the connection properties of the connection 508, 530, 532 are different than standard connection properties, such connection properties can be factored into the behavior of the service mapping component 424. The service mapping component 424 may be configured to adjust its behaviors based on the deviation from the standard connection properties.

In some embodiments, a connection 508, 530, 532 to the fintech gateway 401 is a near real-time, Internet-quality, highspeed ISP link. Such connections offer very little delay, limited congestion issues, and protocols such as the Transmission Control Protocol (TCP) make retries and congestion transparent. These typical transmission speeds over highspeed networks help to establish a baseline set of connection characteristics. Any deviation from the baseline characteristics require specific adjustments for timing message exchange sequences when dealing with tightly timed electronic financial transactions.

Once the connection processing module 510 has collected information about the connection and electronic financial transactions, the connection processing module 510 determines if the incoming message is an HTTP/HTTPs HTML-based message for the user interface processing module 512.

In some embodiments, the connection processing module 510 may include a tag filter. In other embodiments a tag filter within the HTTP header might indicate whether the API call comes from an embedded user interface library. The tag filter may be used at this stage to filter user interface messages from API-based products like Angular and React. These products can be used inside of a web browser and can output JSON user interface data in order to simplify the server development. This API-style of HTML of message may also be sent to the user interface processing module 512.

If the incoming message is not an HTTP/HTTPs HTML-based message for the user interface processing module 512, then the connection processing module 510 determines that a direct financial message has been received. The direct financial message may have been received using an API style of communication employed for computer-to-computer communication. Such direct financial messages may be passed from the connection processing module 510 directly to the service mapping component 424. The services mapping component 424 is further described in reference to FIG. 6.

In some embodiments, the fintech gateway 401 is configured to offer a front-end interface to a registered user to access one or more hosted services.

The fintech gateway 401 includes a service request component 516 and a services database 414. The user interface processing module 512 utilizes the service request component 516 to build an HTML screen and present the services listed in the services database 414.

The services database 414 stores various data about the services (which may help to identify the service), such as properties of the service offerings, what service is offer by the service offering, and what data format or formats is required by the service offering. Service offerings may come and go. As a result, the services database 518 may be updated from time to time to reflect a more current representation of service offerings.

To identify users of the hosted services, the user interface processing module 512 maintains a user database 514. Using the user database 514, the user interface processing module 512 identifies users that have paid to use the service or are authorized in some way to use the service.

In other embodiments, the service request component 516 may use the security component 428 to identify the user of the hosted services. The security component 428 may employ OAuth 2.0 digital identity services, such as when advanced digital identity services are required.

The security component 428 is discussed further in reference to FIG. 7.

In other embodiments, a custom built fintech client may first use an OAuth 2.0 API client to first perform transparent exchanges of digital identity credentials through the service mapping component 424 to the security component 428. Processing subsequent HTML to access services may proceed when the security component 428 gives a go ahead.

In some embodiments, a user may start on a series of Internet web pages provided by the user interface processing module 512. Hosted by a conventional web server, the user interface processing module 512 interfaces to the service request component 516 to draw upon the services database 414 to determine the financial services that are currently connected to the fintech gateway 401. The services database 414 may be regularly updated. The services database 414 may be updated through supervisor-level, privileged connections as new relationships and connections are formed.

In some embodiments, this type of HTTP and HTML web page module may be used by a custom-built client software product or cell phone app that is customized to deal with financial service product offerings.

In other embodiments, a web browser may be used initially to present and view financial services, select different services, and provide the input and authentication needed to request such services. These steps may include login and password access points, the use of browser cookies, and locally cached information to streamline the user's experience when the user has been to the fintech gateway 401 before.

The fintech gateway 401 may provide certain advantages in these embodiments. For example, once the information about a specific financial request is collected from the user, the gateway 401 transitions the requests to the target financial institution devices (service providers).

A service request component 516 collects the all the information input by the user, or that has been cached within the custom-build application and builds ISO 20022 messages for the service mapping component 424.

In some embodiments, when using a custom-built fintech client software program, the ISO 20022 message in a JSON format is sent directly from the client to the fintech gateway 401. However, in order to support the widest range of devices, environments, and operating systems, an internal ISO 20022 alternative is provided.

In other embodiments, the fintech gateway 401 may be used primarily for its parsing and transcoding functionalities. In such embodiments, the service mapping component 424 may focus on processing numerous (e.g. millions) incoming JSON- and XML-based requests on behalf of financial institutions that do not want to accommodate these divergent formats. These types of embodiments are focused on program-to-program communications where the requesting program may be using one of several ISO 20022 message formats that are starting to emerge worldwide. In other embodiments, SWIFT message, NACHA messages, or other legacy formats are transcoded so that the financial institutions themselves do not have to deal with an ever-growing number of payload formats and protocol requirements.

Referring now to FIG. 6, shown therein is an illustration 600 of the elements within a service mapping component, such as the service mapping component 424 introduced in FIG. 4 and shown also in FIG. 5, according to an embodiment. The service mapping component is implemented as part of a fintech gateway, such as fintech gateway 102, 202, 302, 401.

The service mapping component 424 performs advanced parsing and processing. The service mapping component 424 includes advanced parsing and processing elements. The advanced parsing and processing elements include a first parsing module 602, an ISO20022 header parser 612, an ISO20022 XML secondary parser 614, an ISO20022 JSON secondary parser 616, an ISO20022 default parser 618, and a message content router 620.

The implementation by the services mapping component 424 of a multi-tiered parser system may provide expandability, distributed parsing, and greater options for load balancing within the fintech gateway 401.

Since the majority of the messages received by the fintech gateway 401 have a known and limited set of formatting options, there can be speed and efficiency decisions made on the parsing design that can be implemented by the services mapping component 424 and the various elements thereof.

As a result, the services mapping component 424 may process ISO 20022 messages in a manner that is highly flexible and while also providing high processing speed.

As financial institutions embrace ISO 20022, the need for computer-implemented systems and methods for processing millions and billions of transactions per day will become more and more likely.

In FIG. 6, several embodiments will be discussed which illustrate a parsing system implemented by the services mapping component 424 that is highly configurable and durable to expansion and redundancy.

The parsing system uses techniques of content distribution routing combined with streaming tokenization to create a distributed parsing network.

In some embodiments, content addressable memories (CAM), a form of hardware-based content routers, may be used for even greater speed enhancements.

The parsing system is also configured to detect and divide off non-ISO 20022 messages, for example NACHA file format out of the USA and the SWIFT international protocols and formats.

The parsing system of the services mapping component 424 is built upon initial knowledge of the ISO 20022 standard that is complete, yet still evolving and changing.

Currently there are over 400 message type definitions that are first created at a source and then identified, parsed, and acted upon at a destination. Source creation methods for sending ISO 20022 compatible messages are widely available through application program interfaces (APIs). There are many API-based products that provide libraries and tools to hide the complexities of the ISO 20022 format demands. These APIs may build XML, JSON, GraphQL and other formats to match the UML definitions of ISO 20022. Similar APIs exist for receiving, parsing, and processing ISO 20022 messages, but such APIs offer little to handle efficiency, growth, and flexibility.

The distributed parsing technique within the service mapping component 424 starts with a first parser module 602.

In some embodiments, a payload (which may be internal message data 604, or external message data 606) arrives within a secure Hypertext Transfer Protocol (HTTPs), which is currently being used for the majority of content sent over TCP/IP.

External message data 606 may be received from service requestors and service providers.

Internal message data 604 may be service request messages built on behalf of connected users using the user interface provided by the fintech gateway 401.

The first parsing module 602 receives the internal message data 604 and external message data 606. The first parsing module 602 examines the data payload of the received message data to determine a format type of the received message.

In other embodiments, the first parsing module 602 may examine the data within a TCP/IP message payload to determine the payload format. In such embodiments, the HTTP or HTTPs header may not be sufficient to determine the payload format. Additional scan-ahead methods may be used to determine the exact format of the payload. A scan-ahead scanning method would not formally parse the information but would simply scan the buffer holding the message contents looking for keyword or phrases to identify if anything is recognizable within the message buffer.

In these embodiments, the first parsing module 602 may include a streaming scan-ahead scanning method on the received message contents.

In some embodiments, the streaming scan-ahead scanner proceeds through the message contents, the streaming scanner may tokenize any recognizable data elements it comes across (e.g. to create tokens).

If some data elements become tokenized, they can be placed into an internal, universal message format or data-structure. The internal, universal message format is designed to accommodate each field for each type of potential message to be sent or received. In some embodiments there could be several universal format structures for larger groups of related message types. For example, all loan rate requests, mortgage rate requests, insurance rate requests, stock buying and selling rate requests might fall within a common universal message format.

If a non-ISO 20022 message is detected, the non-ISO 20022 message is routed to a legacy message support module 608 for parsing.

The legacy messages (i.e. non-ISO 20022 messages) are parsed into the internal, universal formatted data-structure. The internal, universal formatted data structure can later be used to generate the output message required by the receiver/recipient.

Once the non-ISO 20022 message has been parsed into the internal, universal format data structure, the legacy message support module 608 passes the internal, universal message format to a message content router 620.

The message content router is optimized to route the received message to a specific message type processing module 610. The same message content router 620 can be used with ISO 20022 messages. This may provide an optimization when message type overlaps occur between messages of different formats.

If the first parsing module 602 determines that the received message data format is ISO 20022, the first parsing module 602 sends the ISO 20022 message to the ISO 20022 Header Parser 612. By sending the message to the ISO 20022 header parser 612, a quick initial distributed division of labor on message processing may be achieved.

Since there are many possible payload formats, the ISO 20022 header parser 612 attempts to scan the HTTP header to determine which ISO 20022 payload format is present.

For routing XML, for example, the header may have a value such as: 'Content-type: text/xml'. If the ISO 20022 header parser 612 determines that the message is an XML message, the payload is routed to the ISO20022 XML Secondary Parser 614.

In the case of JSON and GraphQL, the HTTP header may have a value such as: 'Content-type: application/json'. If the ISO 20022 header parser 612 determines that the message is a JSON or GraphQL message, the payload is routed to the ISO 20022 JSON Secondary Parser 616.

For other format types that may be less commonly used, the services mapping component 424 may include an ISO 20022 default parser 618 to handle such other format types. Until a specific parser for the format type or types is built (such as the parsers 614 and 616 for XML and JSON, respectively), the messages can be routed to the ISO 20022 default parser 618. The design of the parsing system of the services mapping component 424 may allow for easy addition of specific parsing modules matching standard format messages as such standard format messages emerge.

Many systems may elect to have a single parser for all HTTP message types and one parser deals with the broadest possible parsing methods to cover all potential message formats. However, a major optimization provided by the fintech gateway 401 is the inclusion of specialized parsers which are configured to parse a particular format, which may include optimizing such functionalities to meet the parsing demands of that particular format.

For messages that follow an XML-compatible format, a Document Object Model (DOM) tree parsing method may be used 614. For those messages that use JSON-compatible formats, a JSON-compatible streaming parser may be used 616. For messages that are not XML or JSON format a default parser 618 can be used to catch newly created standards or less commonly used formats. As long as the number of these types of messages remains small a general-purpose, less efficient parser can be used with minimal negative speed and efficiency effects on the overall fintech gateway 401.

As other message formats are added, other potential parsing techniques can be added to improve flexibility and overall efficiency.

For each parser, the resulting output is placed into an internal, universal message data-structure. The internal, universal message data-structure can be used to build the required format output message.

The specialized routers 614, 616, 618 for each type of message format used may provide a dramatic improvement in overall speed.

As the number of messages coming through grows, an additional message content router 620 may be used. The additional message content router 620 may further divide the message processing flow into the specific message type processing module 610.

The message content router 620 may work on the message Identifier (message ID), also known as the BusinessArea of the ISO 20022 message payload.

The XML secondary parser 614, the JSON secondary parser 616, and the default parser 616 perform tokenization on the message. With the tokenization performed by the XML Secondary Parser 614, the JSON Secondary Parser 616 and the Default Parser 618, a fully tokenized message can be passed to the message content router 620.

This may allow a further distribution of labor to highly specialized message type processing modules 610. For example, the services mapping component 424 may include a plurality of specialized message type processing modules that are each configured to process a message having a particular message ID. For example, a specialized message type processor module 610 may be implemented for any one or more of Account Management (acmt), Cash Management (camt), ATM Card Transactions (catp), Payment Clearing and Settlement (pacs), Trade Services (tsrv), Card Payment Exchanges—Accepter to Acquirer (caaa), Securities Settlement (sese), Payment Initiation (pain), and other message IDs defined within the ISO 20022 specifications.

In some embodiments, multiple message content routers 620 may also work on Message Identification and on the message name (MessageFunctionality) contained within the message.

For example, for the BusinessArea of Payment Initiation (indicated with an abbreviation of "pain"), the message content router 620 may route based on string values such as CustomerCreditTransferinitiative, or CustomerDirectDebitInitiation, to name just a few examples. This additional routing-specific alternative may provide a more flexible and efficient system should the growth of the system create unwanted bottlenecks if one message identification area becomes more heavily used than other areas.

With the received transactional message parsed and routed to a specific message type processing module 610, the activity of acting upon the request can be performed.

The different specific message type processing modules 610 are designed to look into the message type and perform what 'unique' financial request or financial response has arrived. Some messages might pass right through, like what is my current balance on my account.

However, other messages like: 'show me all the 5 year mortgage rates with the selected service providers', require one message in but then it needs to be split into a bunch of messages to be sent out to each and every service provider.

Figure 8:
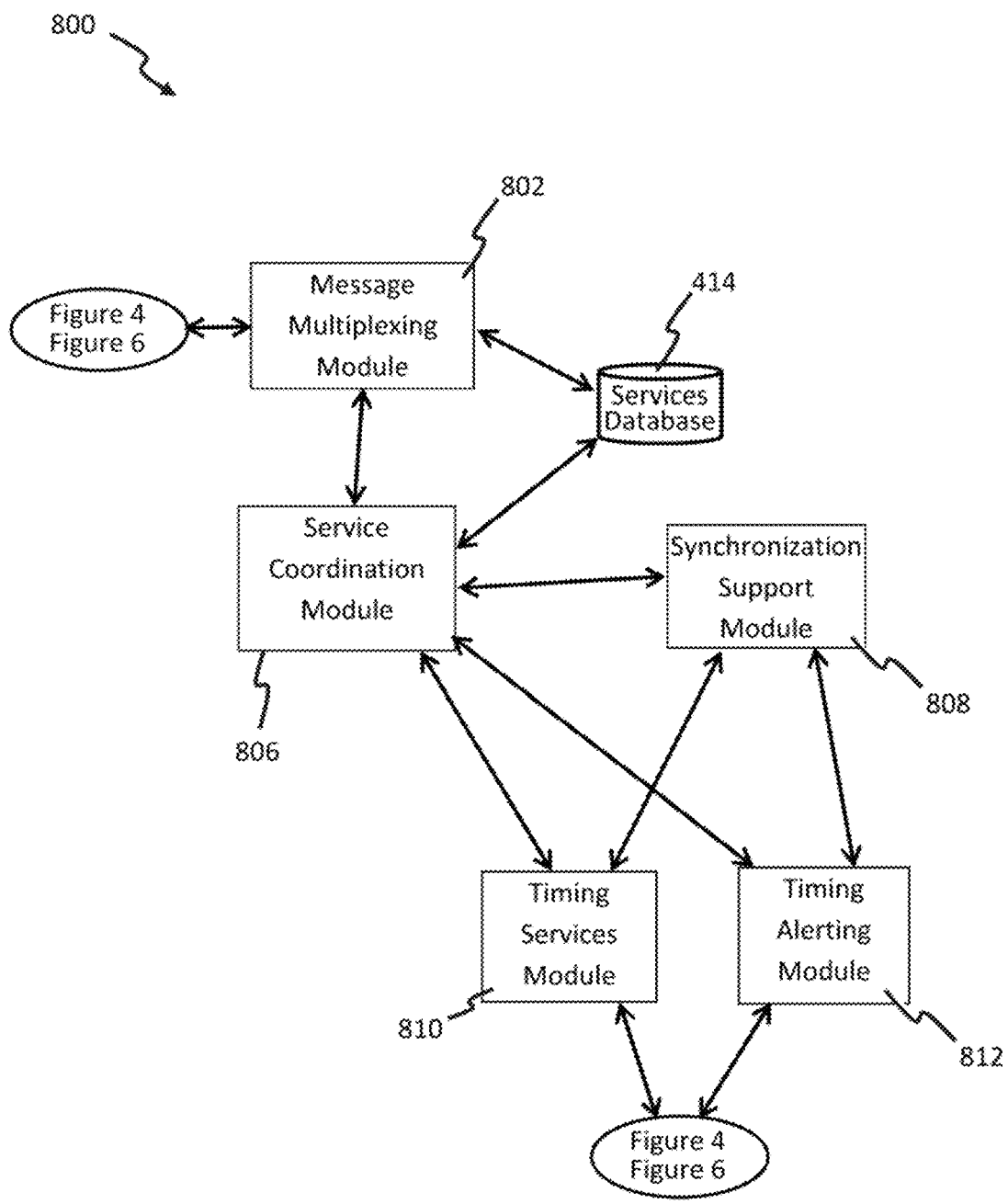
FIG. 8 is a block diagram illustrating elements of the message coordination component of FIG. 4, according to an embodiment.

This multiplexing activity is performed within the message coordination component (FIG. 8).

Likewise, when the 'N' responses come back from each service provider they must be demultiplexed back into one service response to the original requestor.

These activities are some of the message specific behaviors performed based on the message type, message contents and multiple financial services offering the same or similar products.

The specific message type processing module 610 may be configured or custom built to the specific message in order to direct its activities. For example, if the message is a CustomerQueryInterestRate, the specific message type processing module 610 looks into the internal, universal data-structure being passed to build an individual message for each selected service provider from which the user has requested to receive interest rate information.

To perform this multiplexing, and eventual demultiplexing, of service requests, the specific message type processing module 610 uses the message coordination component 426. The message coordination component 426 is described further in reference to FIG. 8.

For many messages, support from the message coordination component 426 may provide services to help with the unique requirements of a specific message type to coordinate and time the steps in the message exchange to ensure a financial transaction reaches its conclusion.

To maintain the state of each electronic financial transaction, the specific message type processing module 610 uses a data storage database 622 to provide a thorough tracking of the requirements for a successful message exchange. These requirements may include, for example, services for synchronization or services for setting response timers and getting alerts. Further services may include request-to-response coordination services. Adjustments to the message timers may be made if a particular transaction is taking place over a satellite or RF cellular link.

Once the message has been processed following ISO 20022 standards, one or more outgoing messages can be constructed. These messages may be going to financial services devices (service provider) or to a service requestor device (service requestor), e.g. retailer device, user device, customer device.

When a service requestor (outgoing) message is constructed, the returning message type is found within the internal universal data-structure, as this is how the data-structure originated. Since there is only one original service requestor, the data-structure holds this information (type of returning message).

In the case of the one or more service providers, the specific message type processing module 610 queries the services database 414 to determine what format is required for each service. For each service request being constructed, a call is made to a specific Msg format construction module 624, 626, 628 that matches the format expected by the service. The specific Msg format construction module may be, for example, an ISO 20022 Msg construction module 624, a SWIFT Msg construction module 626, or the Other Msg construction module 628.

Although only three different Msg construction modules 624, 626, 628 are shown in FIG. 6, additional Msg construction modules may be present. For example, there may be a Msg construction module for ISO 20022 XML messages and a Msg construction module for ISO 20022 JSON messages.

Handing the message over to a Msg construction module 624, 626, 628 results in the specific Msg construction module 624, 626, 628 pulling the fields needed from the internal universal data-structure and building a message. The message is to sent through an outgoing connection processer 630.

In embodiments where the incoming service request has an ISO 20022 XML format and is transmitted to a service provider as an ISO 20022 JSON format, this may represent a specialized transcoding operation. In some embodiments, this is a main service provided within the fintech gateway 401. These transcoding operations can convert any incoming format to any outgoing format. For example, the formats supported may include ISO 20022 XML messages, ISO 20022 JSON messages, SWIFT messages, NACHA messages, or even a proprietary format following Interac™ formats (e.g. in Canada).

In some embodiments, the financial institution device processing the service request may support the same ISO 20022 message format as received from the service requestor device. In such embodiments, the original message may be reconstructed as received. Although such a situation may limit the impact of the fintech gateway 401, there are a myriad of other examples where support from various countries and client products and machine types is not possible without the support of the fintech gateway 401.

The transcoding and message construction operations are supported by the services database 414. The services database 414 may be built and maintained through a supervisory level user interface. As new services are supported, the services database 414 can be updated and expanded to support these new services. In embodiments where transcoding is a main function of the fintech gateway 401, the services database 414 provides very distributed and efficient message processing and message distribution. The fintech gateway 401 also provides a set of services across many financial institutions and satisfies timing requirements so that messages do not timeout from the perspective of the service requestor.

As messages are constructed, the messages are sent to the connection processor 630 for transmission following information in the services database 414 for service providers, or the universal message data-structure for service requestors. This data-structure also holds a connection identifier for the original incoming message and the connection module 502, 504, 506 that is to be used for sending out the message.

For services, the service database 414 indicates which connection module 502, 504, 506 is used to reach the service.

In some embodiments, during message construction, the data storage 622 may be used to hold parameters and information not required for the transcoded output message. For example, if an incoming request message has one or more fields that are specific to that format and not required for the outgoing format, these elements are stored and reused on the resulting outgoing response. This could include incidental fields like start time, physical addresses, phone numbers and other similar specific fields.

In embodiments where the outgoing service data 630 uses a legacy message format, such as an Interac™ type solution, this transcoding method may allow traditional interactions between banks and new open banking services to remain transparent.

When the Msg construction module 624, 626, 628 is interacting with a financial institutions backbone (e.g. financial institution backbone 412 of FIG. 4), the connection processing module 630 may make direct procedure calls into account service devices, loan service devices, or other legacy systems running within the institution.

During the processing of messages 610, the security component 428 is used to confirm digital identity and other security needs for service responders. FIG. 7 highlights some of the additional functions the security component 428 can provide.

Referring now to FIG. 7, shown therein is an illustration 700 of the elements within a security component of a fintech gateway (e.g. gateway 102, 202, 302, 401), such as security component 428 introduced in FIG. 4 and shown in FIGS. 5 and 6.

The security component 428 includes a message risk assessment module 702. The message risk assessment module 702 provides entry into the security component 428.

Each message to be supported in the fintech gateway 401 is assigned a transaction risk value by the security component 428. A default value is assigned for new or unknown messages. This may allow for dynamic expansion within the ISO20022 processing system.

A first risk level (R1) may be used for designating informative type financial requests made by a service requestor. In some embodiments, these may be considered to have the lowest risk. For example, a lower risk financial request may be ISO 20022 transactions with a message Id: Reference Data, message name: PriceReportV04 or SecuritiesAccountStatusAdvice and other similar information requests that do not expose the private or personal information of the service requestor.

A risk level (R2) may be used for designating passive financial requests which ask for personal information and expose a limited amount of private or personal information about the service requestor.

For example, a medium risk financial request may be ISO20022 transactions with a message ID: Account Management, message name: AccountOpeningRequest or AccountReport and similar type messages that expose some private or personal information but are not directly involved with the transfer of funds.

A final risk level (R3) may be for designating requests that actually perform an action upon a service requestor's account or personal financial holdings. For example, a higher risk financial request may be ISO 20022 transactions with a message Id: ATM Card Transaction (catp), with message name: ATM WithdrawalRequestV02, ATMDepositRequestV01 and many others of this type. In these cases where an impact on the service requestor could be grave and disastrous, a higher risk level is assigned.

The risk levels R1, R2 and R3 may provide an opportunity to optimize the processing of digital identity information and credential verification by the fintech gateway 401.

The message risk assessment module 702 maintains a master list of the risk levels. The message risk assessment module 702 acts upon the risk levels.

If the risk level is R1 or R2, the message risk assessment module 702 may utilize an identity cache management module 704.

The identity cache management module 704 maintains an identity token cache 706. The identity token cache 706 contains currently assigned access tokens, a lifespan of the token, and an owner identification for each token. Identity tokens are random values that stand in place of the real digital identities. Using a short-lived identity token dramatically reduces the risk of loss, theft, and potential negative implications for all electronic financial transactions.

If the risk level is R1 or R2, the identity cache management module 704 may first check the local identity token cache 706 for a currently active access token in the cache 706. If one is found, an optimization has been achieved and an authenticated confirmation can be returned to the calling device. If the risk level is R3 or if the identity token cache 706 does not contain a cached identity for the current service requestor, a request is needed to confirm the digital identity. Such confirmation may be performed either internally through a digital identity creation/validation module 716 or through an external identity verification module 708.

In some embodiments, the external identity verification module 708 performs an external call to a credential service provider (CSP) 710 that maintains a database of publicly available access tokens and their matching digital identities 714.

The CSP 710, sometimes known as an authorization server, verifies access requests via the reception of an authorization grant.

In some embodiments, the authorization server 710 is also the resource host and maintains access to the user accounts to be protected.

In such embodiments, where a trusted common authorization server does not exist, it is expected that the resource server also acts as the authorization server.

In such embodiments, the access token may be an authorization grant that can be submitted to the authorization server in order to get an access token to gain access to the resource server (e.g. the user's financial accounts).

In these environments, a CSP 710 is used across a plurality of financial service providers like a fintech gateway 401 to provide service requestors with one central place to which they can submit their digital identities 714 and receive a security access token 712.

The security access tokens 712 may have a lifespan and expire after a configured length of time. Protocols such as OAuth 2.0 have specific protocols for requesting security access tokens and confirming security access tokens.

In other embodiments, the CSP 710 may be locally maintained at the digital identity creation/validation module 716 within the fintech gateway 401.

In such embodiments, the digital identity creation and validation module 716 is implemented to support the needs of security and digital verification for those transactions where the cache 706 cannot be used (e.g. if the identity token cache 706 does not contain a cached identity for the current service requestor).

In variations, the digital identity creation component of the digital identity creation and validation module 716 may use one or more techniques to achieve digital identity security.

In an embodiment, the digital identity creation component uses a random number generator which determines how many digital identity factors are to be collected to re-assert a strong digital identity of the service requestor.

In other embodiments, the same digital identity factors are used each time the digital identity is renewed or confirmed.

Examples of digital identity factors include biometric input values such as fingerprints, facial scans, voice recognition, and many others.

Digital identity factors may include hardware identity information such as cell phone SIM numbers, hardware identities, O/S serial numbers, and many others.

The digital identity factors may be collected by a custombuilt financial services client on the service requestor's computer system.

As the digital identities expire and are refreshed, the digital identity creation and validation module 716 adds the refreshed digital identities to the digital identity database 718.

The digital identities in the digital identity database 718 are linked to an identity token cache 720 by the creation of an identity token. The created identity token is returned to the service request caller to be used in subsequent requests. This relationship is initiated, maintained, and validated by the digital identity creation and validate module 716 following database cross linkage and key management practices well known in the field of database management.

Referring now to FIG. 8, shown therein is an illustration 800 of the elements within a message coordination component 420 of a fintech gateway, such as the message coordination component 426 introduced in FIG. 4 and illustrated in FIG. 6, according to an embodiment.

The message coordination component 420 includes a message multiplexing module 802.

Based on universal message inputs for each specific message type that arrive as inputs from FIG. 4 and FIG. 6, a message multiplexing module 802 performs a splitting of a service request or re-assembly of a response message.

In one direction, the service requestor may make a single request but need the request divided into a plurality of messages for each connected financial institution.

In the other direction, the plurality of financial service responses are then re-assembled into one response for the one service requestor.

To assist with the splitting and re-assembly processes, the message multiplexing module 802 communicates with a services database 414 for information. The services database 414 contains a current list of connected financial services, digital addresses for the connected financial services, and detailed information for routing and assembling a message to a service provider device for the financial service.

The message coordination component 420 includes a service coordination module 806.

The service coordination module 806 coordinates and sets timers for the responses. In doing so, the service coordination module 806 makes use of the services database 414 in coordinating and setting timers for the responses.

The message coordination component 420 service coordination module 806 also includes a synchronization support module 808, a timing services module 810, and a timing alerting module 812 when two or more responses are required. The modules 808, 810, 812 are used by the service coordination module 806 when two or more responses are required.

The timing services module 810 sets timers. The timing alerting module 812 generates timing alert outputs. By setting timers within the timing services module 810 and receiving timing alerting module 812 outputs, messages are tracked in case the messages go missing or are just too delayed to be useful.

The synchronization support module 808 is a fintech gateway 401 service which may be used when two independent service requests are made, and the responses are to be synchronized before a final response is given back to the original service requestor.

For example, when a service requestor decides to move money from a first financial institution to a completely separate second financial institution, for example because the interest rate offered by the second financial institution is better, several steps are synchronized before the service request is fulfilled.

First, the initial service request is provided to the synchronization support module 808 from the specific message type processing module 610 (shown in FIG. 6).

In one embodiment, ISO 20022 configured behaviors are followed to first send a service request to the financial institution holding the money to be transferred to request the money to be transferred, to place a hold on the money to be transferred, and to remove the money to be transferred from the person's account.

The timing services module 810 sets a timer to ensure a response to the first request is received in a timely fashion.

Once the confirmation is received that the money to be transferred is present and has been frozen or held, the pending timer request is canceled. A second service request is sent to the receiving financial institution to instruct the receiving financial institution to deposit the sum of the money to be transferred into the given receiving account.

The timing services module 810 sets a second timer for the second service request to ensure the receiving financial institution responds in time.

Once the second response from the financial institution device is received and the money to be transferred is deposited, the timer can be canceled and a new service request can be sent to the first financial institution device so the first financial institution device can remove the hold or freeze and formally release control of the money to be transferred.

The timing services module 810 sets a timer to ensure a confirmation is received to this service request.

When the final service request is confirmed, the synchronization support module 808 may instruct the specific message type processing module 610 to build a final response to the original service requestor. This will include providing the resulting confirmation results of the attempt to transfer funds.

In some embodiments, the timing service module 810 may be used by other components of the fintech gateway 401. For each timer set by the timing services module 810, the timing alert module 812 uses various call-back methods and operating system (O/S) support services to alert the timing services module 810 of timer expiration.

In some cases where a plurality of service responses are issued, there may be a plurality of timers set for a single request that may be expecting several responses.

In some embodiments, when a service request does not have coordination and synchronization needs, the specific message type processing module 610 may call the timing service module 810 directly. For example, if a service request is to request a current balance of a user's chequing account. These additional linkages can be assumed present when dealing with module-level functionality where object-oriented services are often called in various places within different elements of software.

Figure 9:
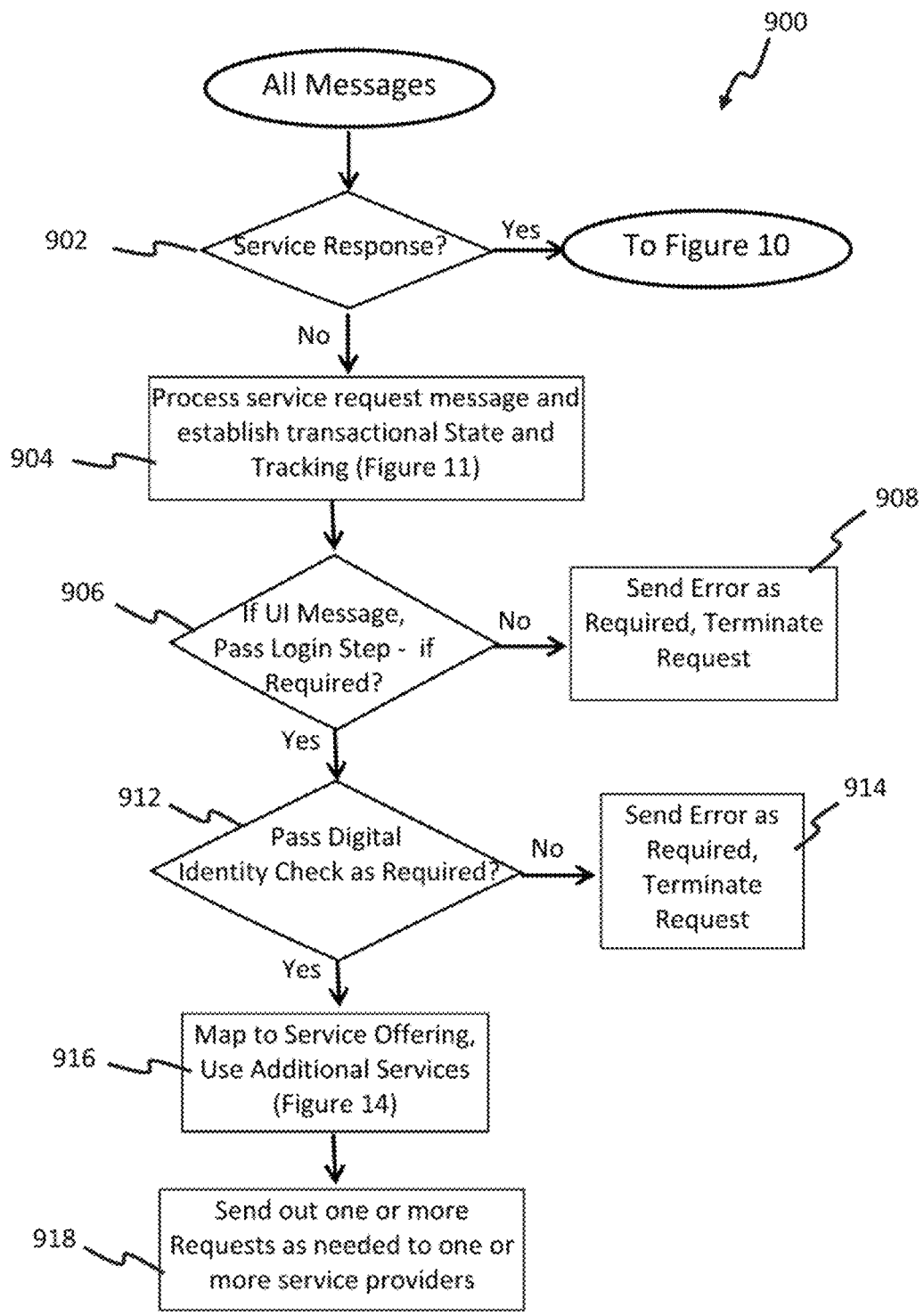
FIG. 9 is a flow chart illustrating steps of a computer-implemented method used within a fintech gateway for offering services, according to an embodiment.

Referring now to FIG. 9, shown therein is a flow chart of a method 900 for a fintech gateway for offering services, according to an embodiment. The method 900 may be implemented by a fintech gateway of the present disclosure, such as any one of fintech gateways 102, 202, 302, and 401.

The reception of all messages leads to a division of operation between a service request 902 or a service response 902 message. At 902, the fintech gateway determines whether a service response message or a service request message is being processed.

Figure 10:
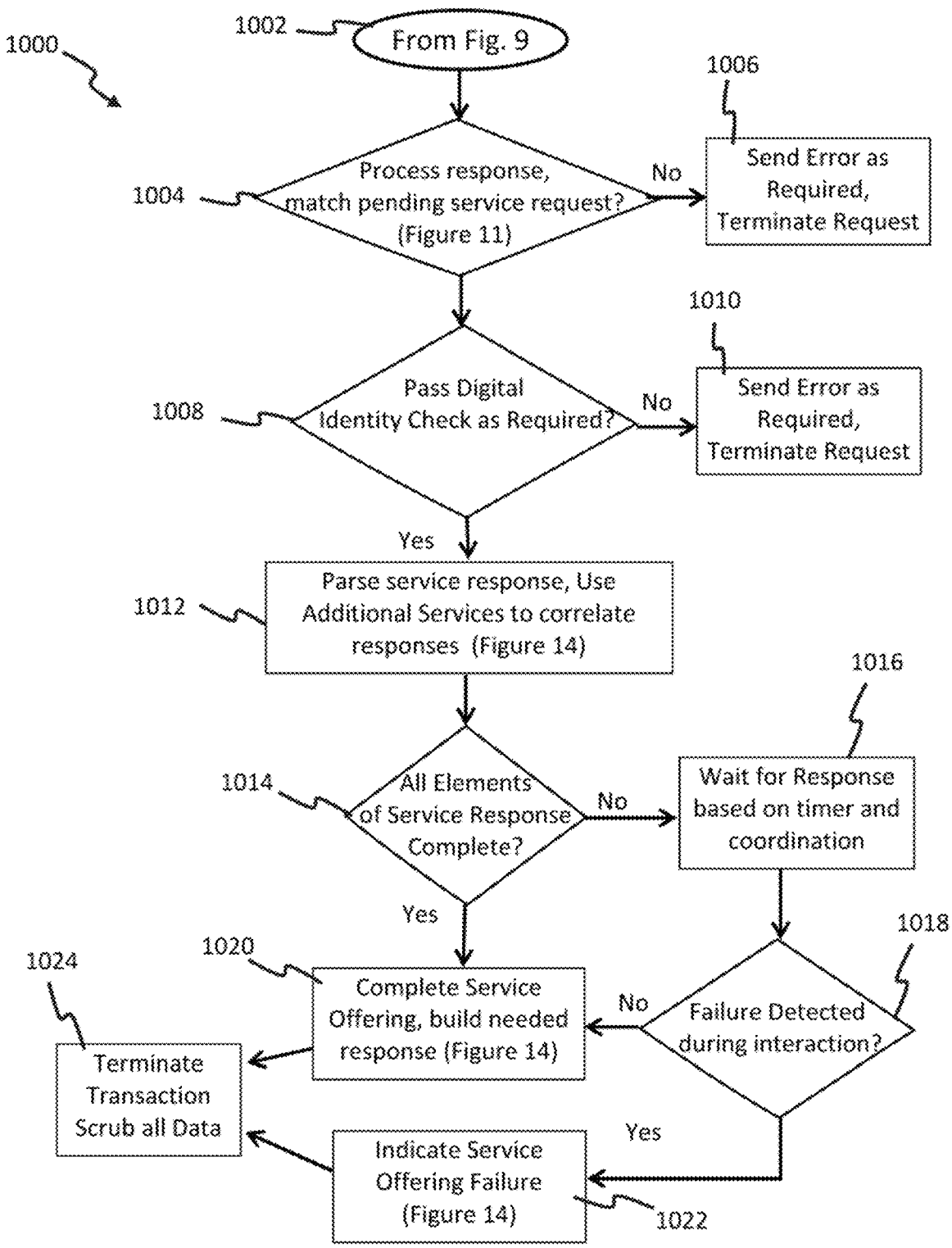
FIG. 10 is a flow chart illustrating steps of a computer-implemented method used within a fintech gateway for processing service responses, according to an embodiment.

If a service response 902 is being processed, then the data flow proceeds to FIG. 10.

If it is determined at 902 that a service response is being processed, the data flow leads into processing the specific communication requirements by establishing transactional state and tracking information at 904.

This also involves finding a current transaction state if processing for a service request has already been started and this is a follow-on message from the service requestor. This is further described in FIG. 11 and provides a connection processing identification and a connection type, i.e. user interface-specific or an API specific type message 904.

At 904, the service request message is processed and transactional state and tracking is established.

Figure 11:
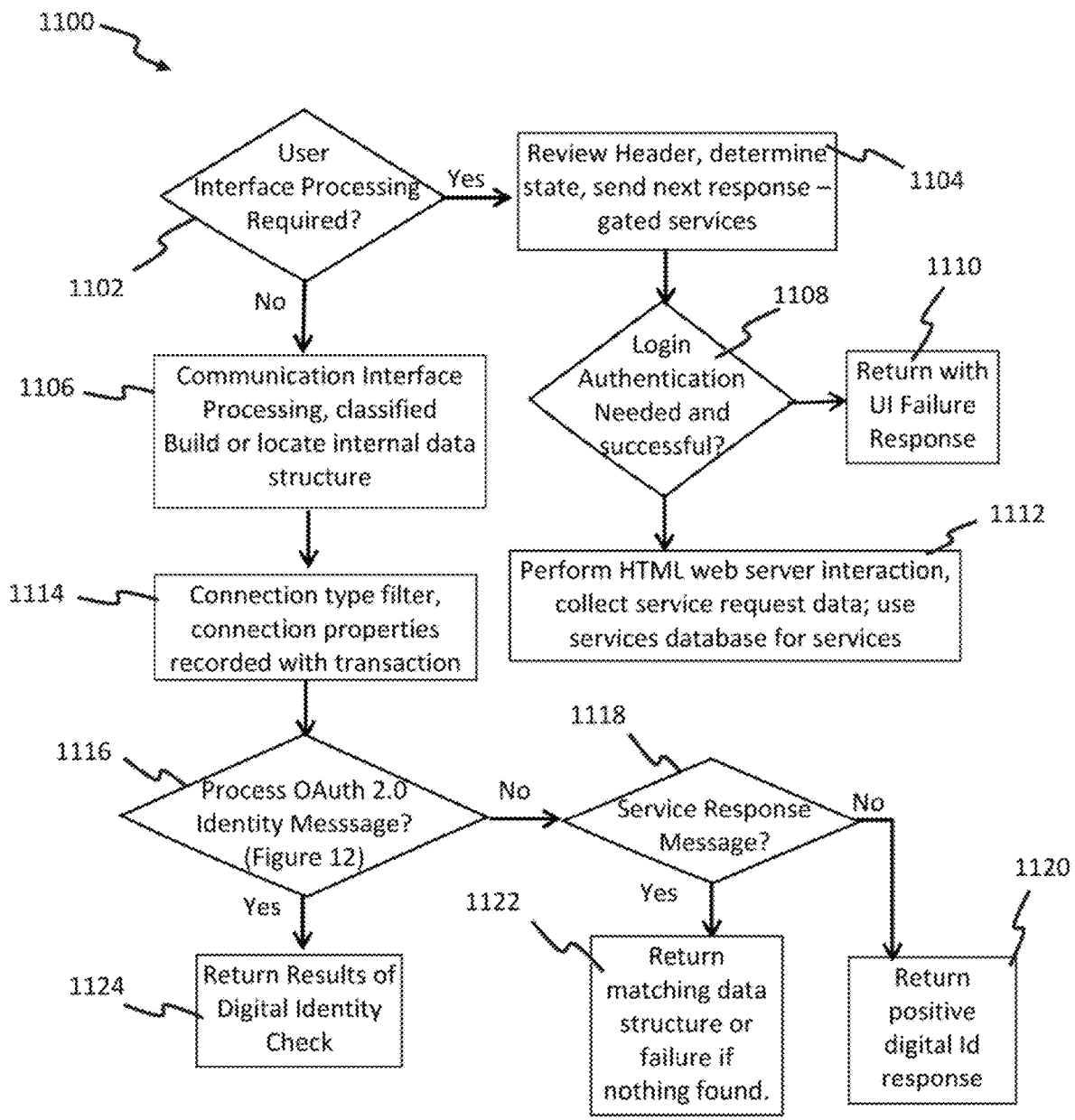
FIG. 11 is a flow chart illustrating steps of a computer-implemented method for processing incoming service requests and service responses and establishing transactional parameters; according to an embodiment.

Based on return values from the data flow of FIG. 11, it is possible that a new user is attempting to connect through the user interface and needs to gain basic login/password access 906. Since in some embodiments the fintech gateway can offer service aggregation products, a traditional web server interface may require basic login authentication 906. If during the establishing of the transactional state the user fails the login process at 906, an error message is sent and the connection is terminated at 908.

If the login passes at 906 or if a login was not required at all or they pass the login step, a check is performed to determine if the service requestor can pass a digital identity check 912. The digital identity check 912 check is described further in FIG. 12.

In some embodiments, the service requestor or service provider is verified through a digital identity, which may include using a digital token or authorization grant. The digital token or authorization grant can arrive in an OAuth 2.0 message sent during the initial interaction phase.

In some embodiments, the fintech gateway 102, 202, 302 acts as a proxy for the application being used by the user to reach a plurality of financial services (e.g. many) that would normally be inaccessible to the user due to formatting, compatibility, and complexity issues.

In some embodiments, the login and password values for a given service provider are provided to the fintech gateway 102, 202, 302 and will act as an immediate proxy for the service requestor.

If the service requestor fails the digital identity check at 912, an error message may be sent as required, and the service request is terminated at 914.

Figure 12:
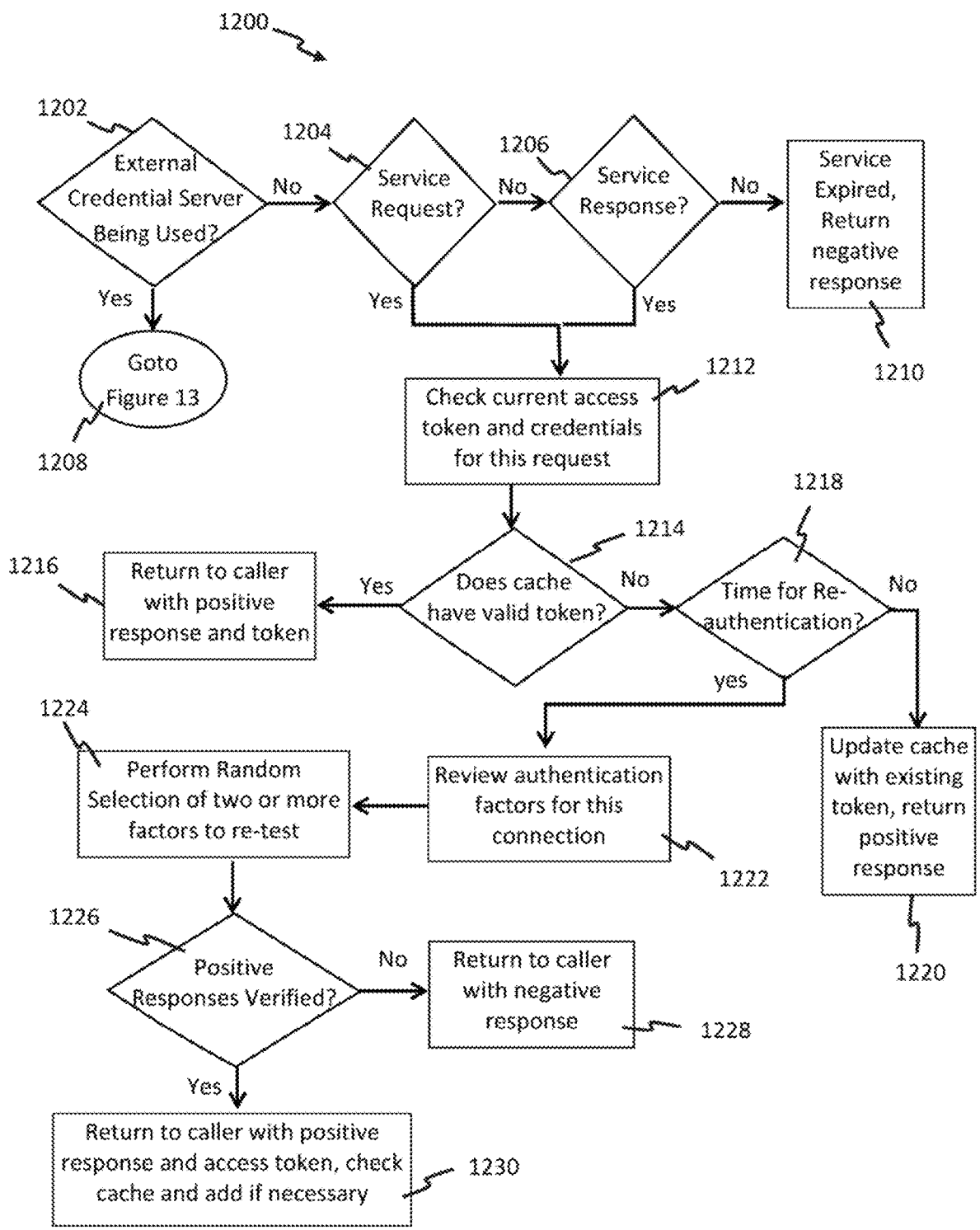
FIG. 12 is a flow chart illustrating steps of a computer-implemented method for internal digital authentication within a fintech gateway, according to an embodiment.

However, when authentication and security completes successfully from FIG. 12, a transaction state is established and the service is mapped into a series of steps, including states that are to be achieved before the service request is fulfilled at 916. Details on this operation are provided in FIG. 14.

Message processing at 916 also performs additional steps of dividing the service request into many service requests, if needed.

Timers are activated to ensure the service completes and other additional support.

Once the additional support is put in place, or if additional support is not necessary, the service request is sent out to one or more financial institution devices. With requests delivered, a transition can take place to wait for responses.

Referring now to FIG. 10, shown therein is a method 1000 processing service responses implemented by a fintech gateway of the present disclosure, according to an embodiment. The method 1000 may be implemented, for example, by any one of fintech gateways 102, 202, and 302.

As the logic continues from FIG. 9 at 1002, the responses are first correlated back to the original service request message at 1004.

If the transaction has timed out and is not available, it means the service responder was too late, timers have expired, and the data structures deleted at 1004. In these cases, an error is returned and the request is terminated at 1006. These steps are further detailed in FIG. 11.

For each incoming service response, it is possible that an additional digital identity check should be performed at 1008, which is described in further detail detailed in FIG. 12.

In some cases, financial service providers may have to be digitally authenticated, such as in the case of, for example, a mobile bank, a pop-up bank, or even a social media bank. These types of more transient banks or financial service providers are put through digital identity checks to ensure another entity is not impersonating the financial institution. These are vulnerable situations for service requestors as impersonators may be trying to acquire personal information from the service requestors. These digital identity checks for service providers are included for those embodiments where an additional authentication and digital identity steps are needed to catch any would-be cyber-criminals trying to use a fake financial institution to take advantage of consumers or other users.

If a negative response is returned at 1008, an error message is sent (if possible) and the request is terminated at 1010.

If the response provided from the data flow of FIG. 12 is positive, then the service response is parsed and acted upon at 1012.

As needed, additional services can be used in the data flow of FIG. 12 to coordinate multiple responses into a single service response to the original service requestor at 1012. Details of this coordination are provided in FIG. 14.

This coordination is designed to ensure all elements of the service response are complete and arrive in a timely manner at 1014.

If some element is missing, late, or wrong, then a further wait is performed to ensure time is provided based on what the coordination component has established at 1016.

Time passes, and in some embodiments additional responses arrive in for processing. Each time a message arrives, a check is performed to determine if a failure has occurred at 1018.

The failure may be the result of a timer expiring for the service request. Eventually a failure may be detected through this interaction at 1018; either the financial institution (service provider) or the customer may have created an issue at 1018. For example, the customer (service requestor) may have aborted the service request or failed to provide some important piece of information.

Figure 14:
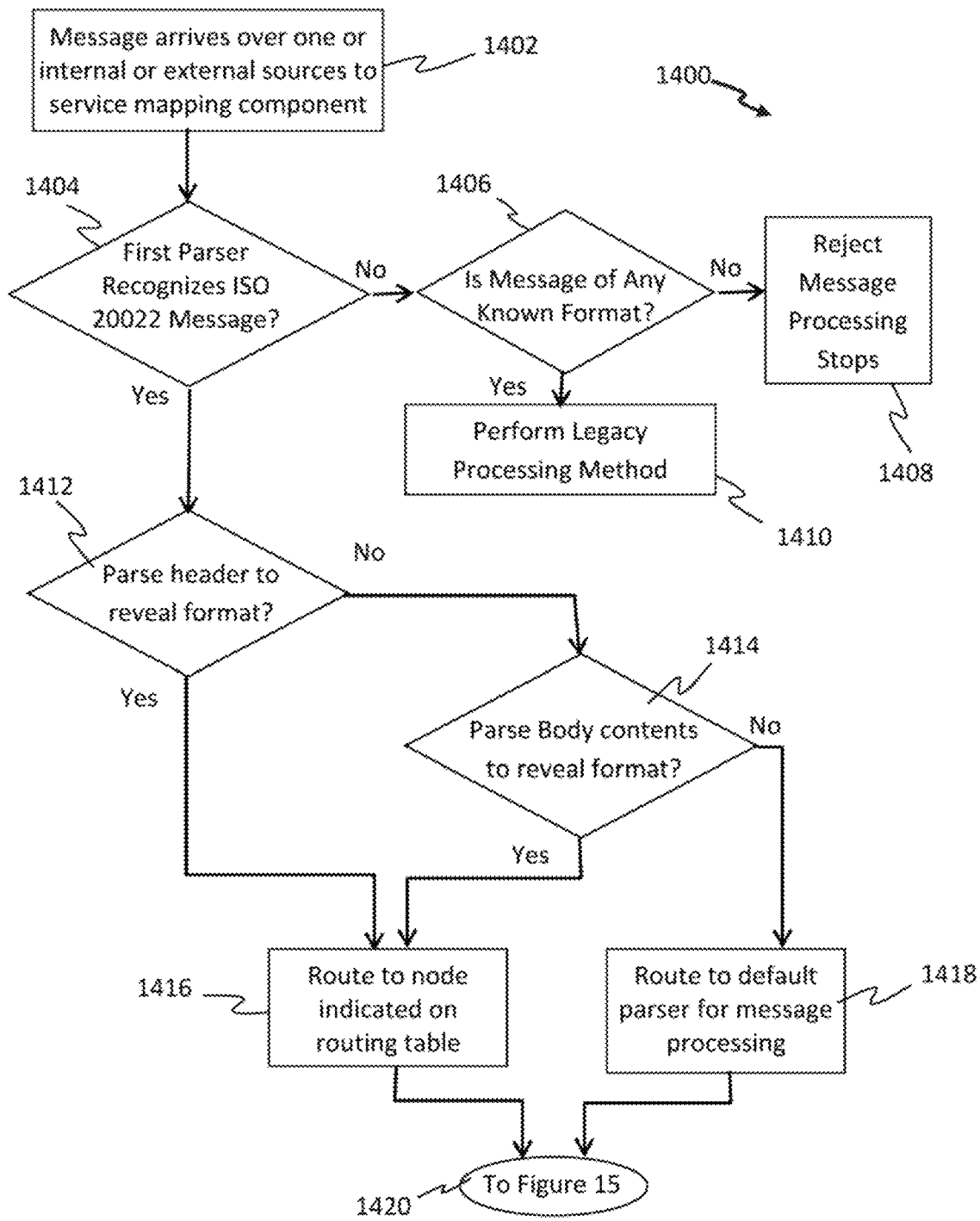
FIG. 14 is a flow chart illustrating steps of a computer-implemented method for message parsing and message processing, according to an embodiment.

If there has been a failure detected, then an indication of the failure is provided to one or both devices at 1022, the transaction is terminated, and all data is cleared or scrubbed from the system at 1024. FIG. 14 provides example logic for returning the service response in the correct format to match the original service request.

If, however, all message exchanges are complete and the financial transaction has run its full course or timers have expired, even if one or more financial institutions did not respond, the service response is deemed complete at 1020.

In more passive situations, such as where the customer has asked for a mortgage quote or a loan quote, then getting 9 or 10 responses back from different financial institutions may be sufficient to make a determination as to which financial institution with which to proceed. At 1020, the necessary response is built following the return message format as detailed in FIG. 14.

Once the successful service request is fulfilled at 1020, the transaction is terminated and any data that could be remaining from the transaction, message exchanges or timers that have been set are identified and cleaned up from storage areas. 1024.

Referring now to FIG. 11, shown therein is a flow chart of a method 1100 illustrating example steps for processing incoming service requests and service responses and establishing transactional parameters, according to an embodiment. The method 1100 may be implemented by a fintech gateway of the present disclosure, such as any one of fintech gateways 102, 202, 302.

Transactional processing starts at 1102 with a check to see if the message is an HTML based user interface (UI) message 1102.

If the message is a UI message, the header is reviewed to determine the state of the interaction, and the next response is prepared, if necessary.

If the fintech gateway 102, 202, 302 is offering a gated financial service offering, then a login may be required by the user at 1108.

If login authentication is required at 1108, the login authentication is performed and if the user fails to authenticate a UI error is returned to the caller at 1110.

If the login has been successful, or if the login is not required, an HTML server element of the fintech gateway 102, 202, 302 performs a next web server interaction with the user at 1112. This may involve going to the services database 414 to present a current list of services provided or collecting service selections from the user at 1112.

In other cases, the message is a direct API-type message with a financial service request or a response present at 1106.

A communication interface processor then classifies the connection and builds or locates an internal data structure for the message.

In some cases, the data structure already exists and the current state of the interaction is recorded in the data structure 1106.

Since the communication interface processor knows the properties of the link it is supporting, the communication interface processor can adjust properties such as throughput quality, quality of service (QOS), and other parameters which depend on the type of the physical connection being used at 1106.

For example, if the link is a satellite link, it is possible the satellite may be temporarily out of range or even experience a higher than average round trip delay. In some embodiments, the connection may also be routed into connection routers and where HTTP/HTTPs requests are assigned in round-robin fashion or using some other load-balancing and fault-tolerant methods at 1114.

Where necessary, the connection properties are recorded and associated to the transaction using several possible methods. For example, in some embodiments the properties and throughput parameters of the connection may be placed in a uniquely coded HTTPs header property to pass to the next stage of processing at 1114.

At 1114, the connection is filtered into HTTP or HTTPs user interface activities, HTTP and HTTPs API based activities, and any other activities that are supported by the fintech gateway 102, 202, 302.

If HTTP header examination confirms that the message is an OAuth 2.0 request or response at 1116, the processing logic moves to the data flow of FIG. 12 to perform digital identity processing.

OAuth processing may be necessary for UI-type interactions before the fintech gateway 102, 202, 302 proceeds with the offering of services.

If the return from the data flow of FIG. 12 indicates that OAuth was processed, then the return from that digital identity check is returned at 1124. Otherwise, if the message is any other API message sent from computer-to-computer, then a check is performed to see if the message is a service response message at 1118.

If a data structure was found in step 1106, then the current state of the message can be determined and the message header will contain information to indicate if it has arrived from a service responder at 1118.

If the API message is a service request message, a positive return is given for both the UI check and the digital Id check at 1120. Otherwise, the matching data structure is returned to the service response caller at 1122. In the situation where no data structure was found, but the message has arrived from a service responder, an error is returned at 1122.

Referring now to FIG. 12, shown therein is a flow chart of a method 1200 illustrating example steps for internal digital authentication within a fintech gateway according to an embodiment. The method 1200 may be implemented by a fintech gateway of the present disclosure, such as fintech gateway 102, 202, 302.

At 1202, an initial step is performed which uses a check to determine if the fintech gateway is using an external credential service provider (CSP) for digital authentication. This may take the form of a database entry in a credential database or some other data structure.

Figure 13:
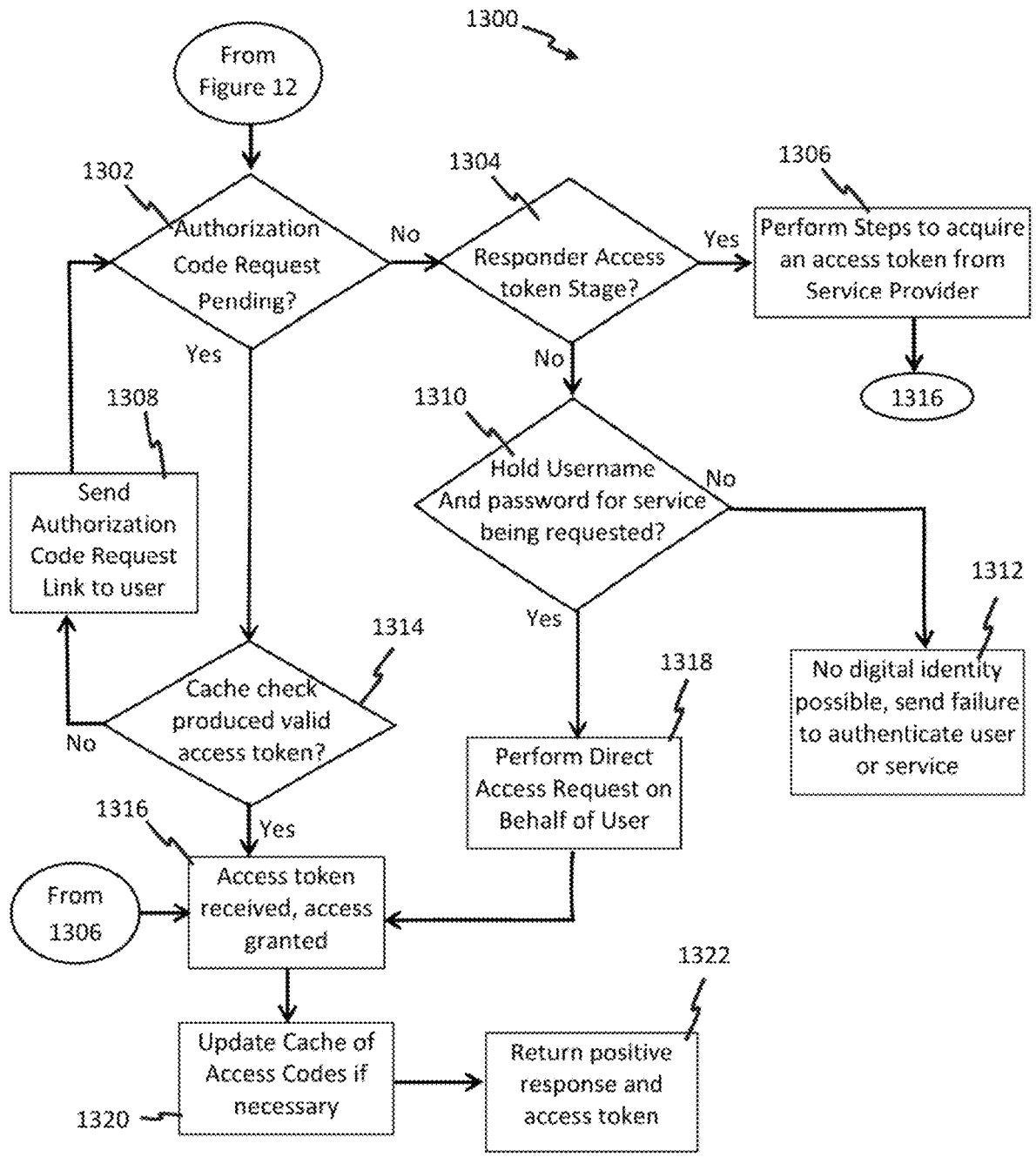
FIG. 13 is a flow chart illustrating steps of a computer-implemented method for external digital authentication from a fintech gateway, according to an embodiment.

If an external service is being used, at 1208 the logic continues in the data flow of FIG. 13.

If an external CSP is not being used, an internal system supporting digital authentication within the fintech gateway 102, 202, 302 is used.

First, a confirmation is performed to determine if the received message is for a new or known service request at 1204 or a known service response at 1206.

The contents of the message header and the located data structure for the service request may guide that decision.

If at 1204 the message is not a service request, and at 1206 the message is not a service response, then at 1210 the service is determined to be expired. In this case, control returns to the caller and a negative response is provided to the request at 1210.

If the message is determined to be either a service request at 1204 or a service response at 1206, a check is performed at 1212 to determine the current state of the existing authentication credentials for the service requestor or the service provider.

A determination is performed at 1214 to determine if the cache has a valid token for authenticating the service requestor or service provider. If the cache has an existing token to authenticate the service requestor or service provider, the existing token is returned to the caller with a positive response.

If the cache does not have a valid token, there may be a few possible reasons. There is a chance, for example, that the token that is in the cache has expired (e.g. each authentication token may have a lifespan when it is granted).

At 1218, if there is not a valid token in the cache, a check is performed to determine if re-authentication is required.

In some embodiments, a check may be performed using the services database to determine the duration of the digital identity.

At 1220, if for some reason a re-authentication is not required at 1218, the cache is updated with the existing token and a positive response is returned. It is possible that a financial institution may be treated as a trusted provider, which would give the financial institution a pass on being re-authenticated.

When re-authentication is required at 1218, a new authentication code or access token is generated. The generated authentication code or access token can be used for some number of subsequent transactions.

At 1222, if it is time for a re-authentication at 1218, a review of the authentication factors for the connection is performed.

On the service provider side, this may include a financial provider device code that can be used for a certain length of time, or a certain number of transactions (which may be a large number) depending on how many transactions (e.g. thousands) are being processed per unit time.

When re-authentication is required, at 1224 a random selection of two or more of the available factors may be performed to make it harder for an impersonator to take over the service provider.

At 1224, if the authentication is being performed for a service requestor, all known biometric, physical, known and held values that make up the multi-factor authentication (MFA) fed into a random selection process.

Where possible, multiple factors are acquired for each of the areas: what is known (knowledge-based), what is possessed (possession-based), and what are inherited authentication factors (inheritance-based).

The randomization step performed at 1224 can be added to make it extremely difficult to impersonate or co-opt a connection or a transaction. In such a case, a random number generation step is performed for the service requestor or service responder at 1224. The random number that is generated results in a mapping to a specific authentication action.

At 1226, the process reviews whether a positive response is received. This may involve much interaction with a service requestor or a service provider. This may involve one or more challenge questions, double-checking system values harvested earlier, or some other advanced safety procedure.

If the verification at 1226 fails, a negative response is returned to the caller that asked for authentication at 1228.

If authentication is verified, then the return is given back to the caller with a positive response and a renewed access token at 1230. The token cache is also checked and updated so that further efficiencies can be leveraged.

Referring now to FIG. 13, shown therein is a flow chart of a method 1300 illustrating example step for external digital authentication from a fintech gateway, according to and embodiment. The fintech gateway may be the fintech gateway 102, 202, or 302.

If the digital identification process is supported through external methods from the data flow of FIG. 12, control arrives into FIG. 13 at 1302.

At 1302, a first check is performed to determine if there is an authorization code request still pending. This includes first checking to see if re-authorization is required and then checking if the first step of the process has been completed.

If user authentication is required (i.e. authorization code request is pending), a first check is performed to determine if an access token can be found in the cache for the service requestor or service responder at 1314.

If the service request is a low risk (R1) or medium risk (R2), the active value in the cache may be sufficient for this service request at 1314. If so, the access token is retrieved, and access is granted at 1316. If the cache does not contain a valid access token at 1314, an authorization code request link is sent back to the user or the connected service responder at 1308, so the user or connected service responder can authorize the fintech gateway 102, 202, 302 to access the services being requested. This process loops until authorization is granted by the user or the service.

Control returns until the service authorization request is processed and an authorization code is received and verified at 1304.

With the authorization code generated, the fintech gateway 102, 202, 302 may then request an access token, using the user's secret at 1306. Once complete, the access token is received and processed at 1316.

If a service authorization stage is not pending and the requesting access token stage is not required, it is possible that an Implicit Access Token generation method is being used.

In some embodiments, where there is a close relationship between the client application and the fintech gateway 102, 202, 302, the user may provide their username and password for the service being requested at 1310.

If this is not true, then it is not possible to acquire a digital identity for this service requestor or service provider at 1312. This means that the service requestor or service provider does not have a digital identity and authorization requests failed to produce a valid token at 1312.

A negative response is sent back to the caller in this case at 1312.

When the username and password does exist within the fintech gateway 102, 202, 302 for one or more services, a direct access request is submitted on behalf of the user at 1318. The resulting access token is then processed at 1316.

Access token processing at 1316 indicates that a new access token is present, and a positive response can be given to the caller. The token itself is also passed back to the caller. The token cache for the service requestor or service responder is updated with the new token with its expiry period at 1320. Control then returns to the caller with a positive response and the access token at 1322.

Referring now to FIG. 14, shown there is a flow chart of a method 1400 of example steps for message parsing and message processing, according to an embodiment. The method 1400 may be implemented by a fintech gateway of the present disclosure, such as the fintech gateway 102, 202, 302.

At 1402, a message is received from an internal or external source into the service mapping component.

At 1404, a first parser looks into the message to determine if HTTP, HTTPs, or any initial ISO 20022 format is recognizable.

At 1406, if the message is not an ISO 20022 message, a subsequent check is performed against other known or identifiable formats.

Some of these identifiable formats may include, for example, the SWIFT (the Society for Worldwide Interbank Financial Telecommunications) message format, or the ACH message format, following the NACHA format from the USA, or the EDIFACT message format following the United Nations rules for Electronic Data Interchange or even the SEPT message format, following the Single Euro Payments Area or others.

If the message format is identified at 1406, the message is passed to the matching legacy processing module at 1410. If the message format is not identified at 1406, the message is rejected and processing stops at 1408.

If, at 1404, the first parser identifies an ISO 20022 message from the HTTP or HTTPs header, then a second parser is used to determine the individual ISO 20022 format used.

Due to the open definition style of ISO 20022, there are several different formats allowed to carry the payload. For example, there are several variants of JSON that are possible, XML, JSON, GraphQL and others.

If the second parser recognizes something within the HTTP or HTTPs header, the message is routed to a matching parser for the format type at 1416. This sub-parser is described further in FIG. 15.

If the header was poorly formed and did not reveal the payload type, then a scan of the body contents is performed to review the format at 1414.

If no confirmation is obtained at 1414, then the message is passed to a default parser at 1418 to determine if subsequent processing can be performed on the message. These additional parsing steps are described in FIG. 15.

Figure 15:
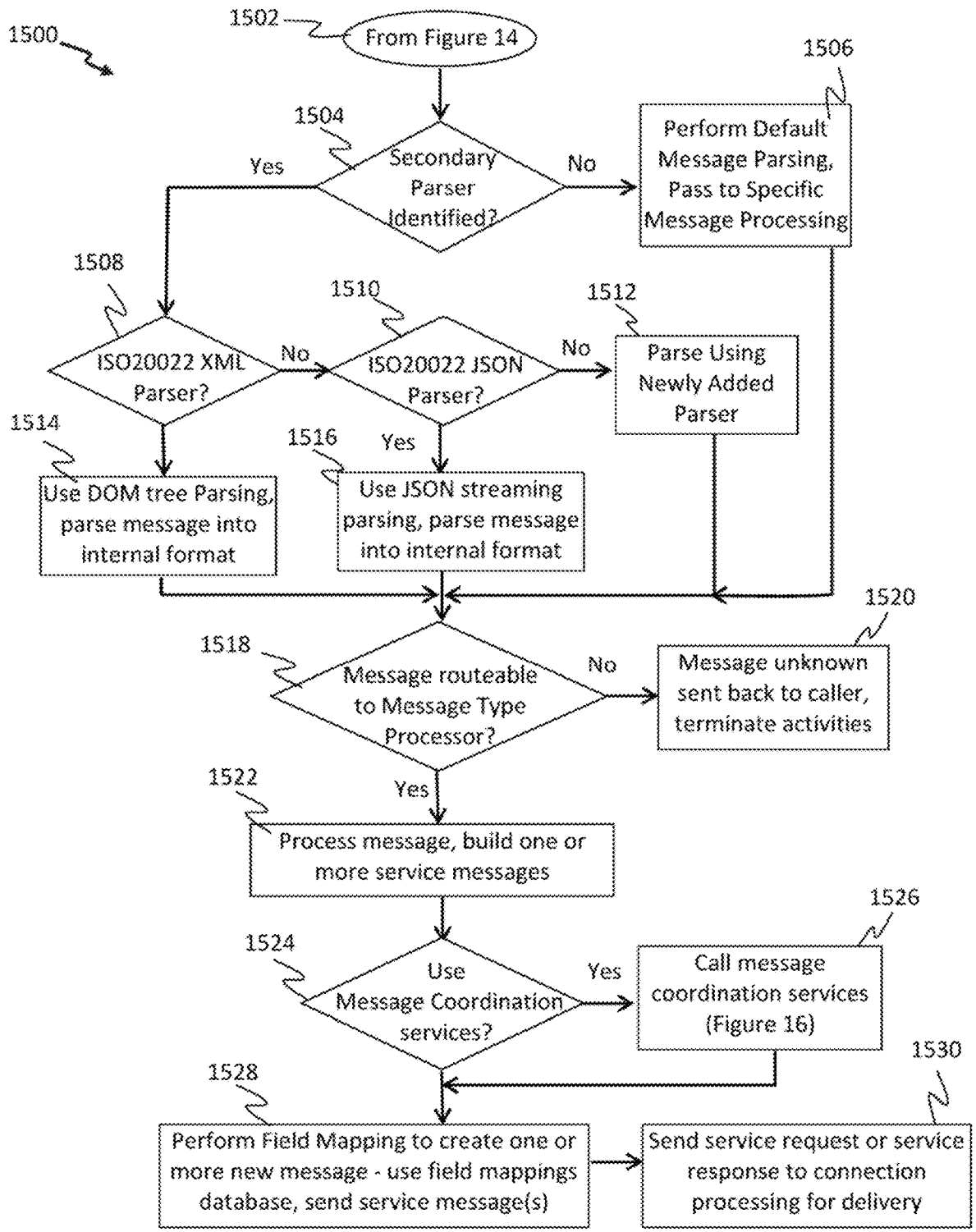
FIG. 15 is a flow chart illustrating steps of a computer-implemented method for message parsing and message processing, according to an embodiment.

Referring now to FIG. 15, shown therein is a flow chart of a method 1500 of message parsing and message processing steps, according to an embodiment. The method 1500 may be performed by a fintech gateway of the present disclosure, such as the fintech gateway 102, 202, 302.

The method 1500 initiates at 1502 from FIG. 14 and a secondary parser is identified based on the input from the data flow of FIG. 14.

If the input from FIG. 14 indicates that a default parser is to be used, then an attempt is made to parse the message using a brute-force method at 1506. If the default parser at 1506 cannot identify key elements of an ISO 20022 message, then a check for a known message type will fail at 1518. If the message is unknown or unparsable, then it is sent back to the caller with a negative response and the transaction is terminated at 1520.

If the input from FIG. 14 indicates that the message has an XML type format at 1508, then a specialized DOM tree parsing technique is used and the resulting tokens are placed into an internal, universal data structure built for the message at 1514.

The control then moves to the message content router to find a message type processor for this message type at 1518.

If the message does not have an XML format, then a check is performed to determine if the message has a JSON format at 1510.

If it is determined at 1510 that the message has a JSON format, then a JSON streaming parser is used to parse the message into tokens, which are placed into an internal universal data structure for processing.

If the message is determined not to be a JSON type format at 1510, then any new ISO 20022 formats are added here to parse the message at 1512. This allows for dynamic expansion of the parsing tree for one or more newly added format types at 1512.

With the message parsed using the most efficient method possible, the message content router is used to route the message to a destination message type processor at 1518.

There are situations where even a parsable message, in a known format, may have an ISO 20022 message type that is so new that the fintech gateway 102, 202, 302 is unaware of its existence and does not have the coding to process the message. In this case, the message is rejected and the process terminated at 1520.

If the message is known, the message is sent to the matching message type processor at 1522. The message is processed using the service managers designed for that message type. As needed, each message type processor may use additional coordination services at 1524. If extra services are needed to multiplex the message into many messages or to demultiplex many messages into one message, a call is made for message coordination services at 1526. These services are further described in FIG. 16.

After performing additional services or if additional services are not required, the resulting message or messages going out from the fintech gateway 102, 202, 302 can be constructed at 1528.

To do this, field mapping is performed following the field mapping database that instructs what format each service requires for their message formats.

For messages to service requestors, the internal, universal data structure holds the original format requirements for the initial received message from the service requestor 1528.

These resulting service request or service response messages are then delivered to the appropriate connection processor for transmission at 1530.

Figure 16:
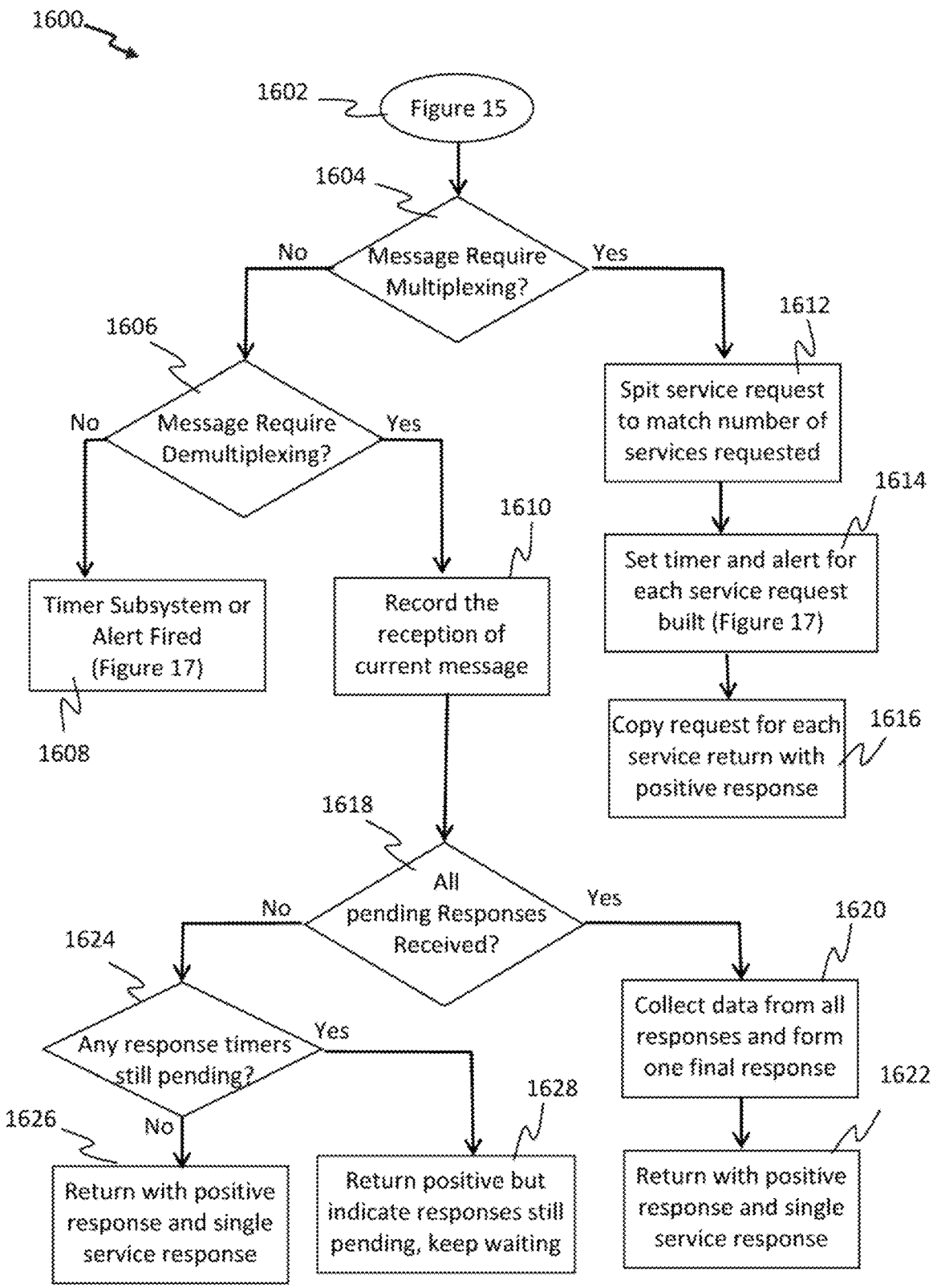
FIG. 16 is a flow chart illustrating steps of a computer-implemented method for performing additional service functions within a fintech gateway, according to an embodiment.

Referring now to FIG. 16, shown therein is a flow chart of a method 1600 of example steps for performing additional service functions within a fintech gateway, according to an embodiment. The fintech gateway may be fintech gateway 102, 202, 302.

When additional services are requested from FIG. 15 at 1602, a first check is performed to determine if message multiplexing is required at 1604.

If there is message multiplexing required, the service request is split into a number of service requests based on the selected number of services present at 1612.

At 1614, a timer is started, with associated alert information for each of the service requests to be built. The timer support is detailed further in FIG. 17.

At 1616, a copy of the original request for each different requested service is then returned with a positive response to the caller.

If the service did not require multiplexing, the service may require might demultiplexing. At 1606, a determination is made as to whether the message requires demultiplexing.

If the message does not require demultiplexing, then it determined to be a request for timer services at 1608. These are provided in FIG. 17.

If the message does require demultiplexing at 1606, the current message is recorded in the data structure at 1610 and a review of the number of expended responses is performed at 1618.

If all the pending responses for this request have been received at 1618, then the data is collected from all responses to form one final complete response to the user at 1622. This may be returned to the user in an ISO 20022 format or an HTML format, for example.

If there are still pending responses, a check is performed to determine if there are any timers still pending at 1624.

It is possible that some timers run longer or shorter than others based on the communication type being used.

If there are still response timers running at 1624, then a positive return is given but with an indication to keep waiting for more responses at 1628. Otherwise, the data from all received responses is collected into one message and a complete is returned at 1626.

Figure 17:
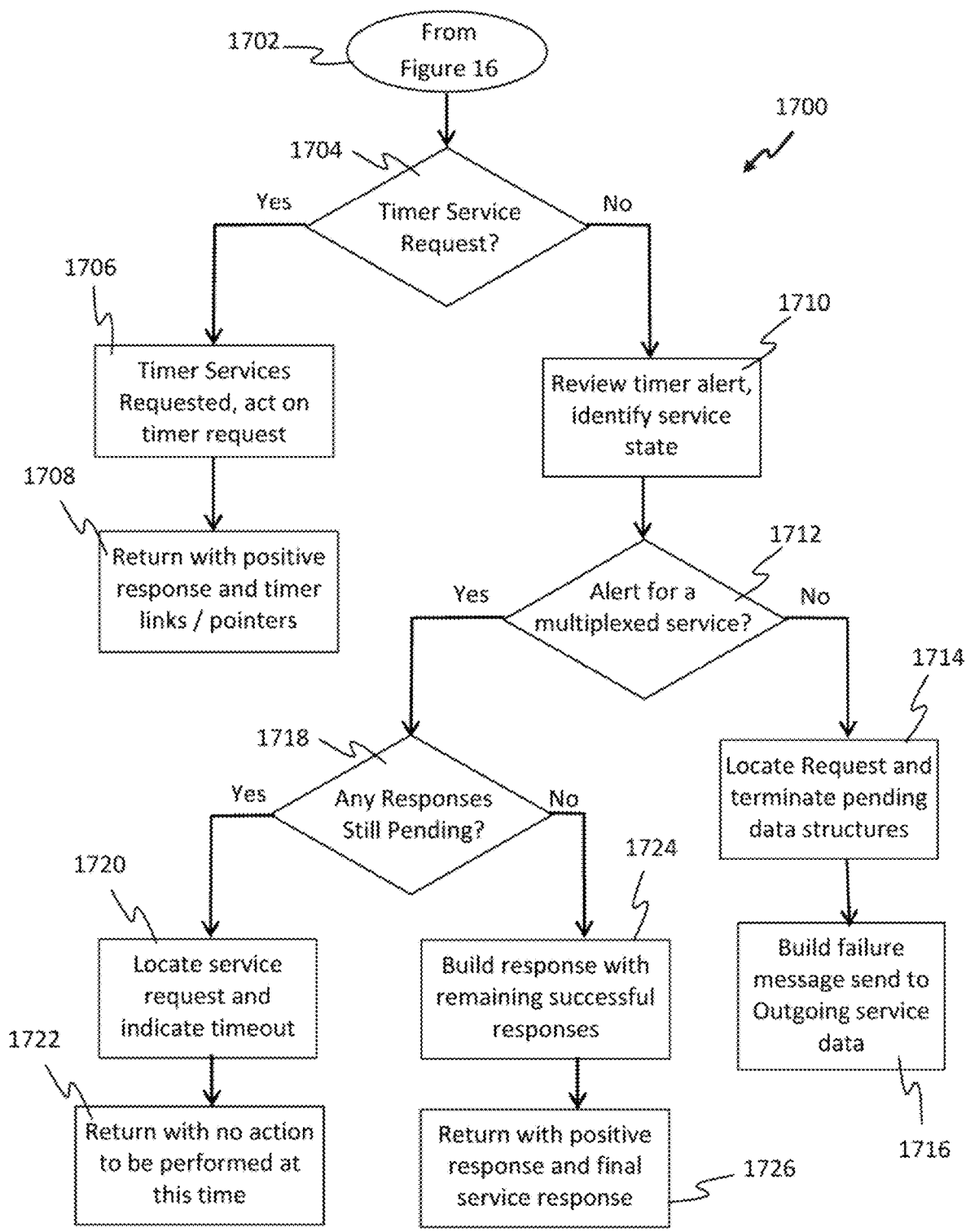
FIG. 17 is a flow chart illustrating steps of a computer-implemented method for performing additional service functions within a fintech gateway, according to an embodiment.

Referring now to FIG. 17, shown therein is a flow chart of a method 1700 of performing additional service functions within a fintech gateway, according to an embodiment. The fintech gateway may be the fintech gateway 102, 202, 302.

As timer services are requested from FIG. 16, at 1702, they may also be arriving from timer alerts messages that have been set for various service responses.

A check is performed to verify that a timer service is being requested at 1704.

If a timer service is requested, the timer is first set on behalf of the caller at 1706 and a return is given with a pointer or reference to the timer at 1708.

If a timer service request is not present at 1704, a timer alert has gone off for a pending service request.

A review is performed of the alert to identify the service state related to this alert at 1710.

If the expired timer is not for a multiplexing service at 1712, then the alert is for some other type of internal fintech gateway 102, 202, 302 need.

An attempt is made to locate the request at 1714, which did not involve multiplexing, and, once found, the service request is terminated and a response is given back to the service requestor at 1716.

Otherwise, if the alert was for a multiplexed service at 1712, a check is performed to determine if any responses are still pending at 1718.

If there are still pending responses at 1718, the service request is located and a timeout is indicated at 1720.

Then a return is given to the caller with a "no action to be performed" indication at 1722.

If there are no further responses pending at 1718, a response is built with all the remaining responses 1724. A positive return is given to the service with a final response at 1726.

While the above description provides examples of one or more apparatus, methods, or systems, it will be appreciated that other apparatus, methods, or systems may be within the scope of the claims as interpreted by one of skill in the art.

The invention claimed is:

1. A computer-implemented method of providing real-time access to electronic services through a user interface and (application programming interface) API service requests using a gateway device, the method comprising:
    receiving a services message at a connection processing device configured to support a physical link, the services message including a message header;
    processing the services message for service mapping by a service mapping component, including:
        scanning the message header to determine whether the services message is a user interface message, received from a user via a front-end interface, or a direct financial message;
        if the services message is the user interface message, building a standard message using request information received via the user interface and passing the standard message to the service mapping component;
        if the services message is the direct financial message, passing the direct financial message to the service mapping component; and
    wherein the service mapping component is configured to generate at least one outgoing service request for at least one service provider from the services message, each of the at least one outgoing service requests having a message format that is supported by a respective receiving service provider device, and wherein outgoing service requests generated from user interface service requests and outgoing service requests generated from direct financial messages service requests appear the same to each respective receiving service provider device; and
    sending each of the at least one service outgoing service request to the respective receiving service provider in real-time to facilitate the electronic services for the user.

2. The method of claim 1, wherein scanning the message header to determine whether the services message is the user interface message or the direct financial message includes scanning the message header to determine whether the services message is an HTTP/HTTPS HTML-based message, and wherein the method further comprises classifying an HTTP/HTTPS HTML-based message as the user interface message.

3. The method of claim 1, wherein scanning the message header to determine whether the financial services message is the user interface message or the direct financial message includes scanning the message header to determine whether the services message is an HTTP/HTTPS HTML-based message, and wherein the method further comprises classifying a non-HTTP/HTTPS HTML-based message as the direct financial message.

4. The method of claim 1, wherein each of the receiving service provider devices is selected from a group consisting of a bank institution device, a loan institution device, a cryptocurrency institution device, a financial subnetwork device, a bank device, a fintech bank device, a mobile bank service provider device, a pop-up bank device, a social network bank device, a credit union device, and a financial backbone device.

5. The method of claim 1, wherein the direct services message is an API-based service request received using an API style of communication employed for computer-to-computer communication.

6. The method claim 1, wherein the services message is received by the connection processing device over a connection, and wherein the connection is over a public network, a physical network, a virtual private network, a direct leased line, a function call or a data communication method for exchanging messages.

7. The method of claim 1, wherein the connection processing device includes redundant connection modules for managing protocol differences between an HTTP over TCP/IP methodology and a non-HTTP over TCP/IP protocol methodology.

8. The method of claim 1, wherein the front-end interface is presented to the user based on the user being a registered user with rights to access one or more hosted financial services.

9. The method of claim 1, further comprising providing the user interface comprising an HTML screen configured to present one or more services listed in a services database and receiving the services message via the user interface.

10. The method of claim 9, wherein the services database stores services data including any one or more of service provider identifier, service provider name, service name data, service details data, link data, service identity data, and a data format required by the service.

11. The method of claim 1, further comprising maintaining a user database of users authorized to access the services via the user interface, receiving user identity verification data from the user via the user interface, and determining whether to provide access to the user using the user identity verification data and the user database.

12. The method of claim 1, further comprising verifying a digital identity of the user of the user interface via an OAuth 2.0 API client to perform a transparent exchange of a digital identity credential with a security component, and processing an HTML component of the user interface message to access services upon successful verification by the security component.

13. The method of claim 1, wherein the user interface comprises a web browser configured to present financial services, receive a user selection of financial services, and provide an input an input and authentication needed to generate a service request.

14. The method of claim 1, wherein the request information includes input data received from the user via the user interface and cached data.

15. The method of claim 1, wherein the direct financial message is program-to-program communication in which a requesting program is using an ISO 20022 message format.

16. The method of claim 1, wherein the direct financial message is a non-ISO 20022 message format.

17. The method of claim 1, wherein generating the at least one outgoing service request includes transcoding the services message from a first message format into an outgoing service request having a second message format.

18. The method of claim 1, wherein generating the at least one outgoing service request includes generating a first outgoing service request and a second outgoing request from the services message, wherein the first outgoing service request is destined for a first receiving service provider device and the second outgoing service request is destined for a second receiving service provider device, and wherein the first and second outgoing service requests are in a message format matching their respective receiving service provider devices.

19. The message of claim 1, further comprising determining the message format of each of the at least one outgoing service requests using a services database for storing required message formats of service providers.

* * * * *